US012437767B2

(12) United States Patent
Wang et al.

(10) Patent No.: US 12,437,767 B2
(45) Date of Patent: Oct. 7, 2025

(54) MULTI-CHANNEL AUDIO SIGNAL ENCODING AND DECODING METHOD AND APPARATUS

(71) Applicant: Huawei Technologies Co., Ltd., Guangdong (CN)

(72) Inventors: Zhi Wang, Beijing (CN); Jiance Ding, Beijing (CN); Bingyin Xia, Beijing (CN); Bin Wang, Shenzhen (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 18/153,128

(22) Filed: Jan. 11, 2025

(65) Prior Publication Data

US 2023/0154471 A1 May 18, 2023

Related U.S. Application Data

(63) Continuation of application No. PCT/CN2021/106101, filed on Jul. 13, 2021.

(30) Foreign Application Priority Data

Jul. 17, 2020 (CN) ......................... 202010699706.7

(51) Int. Cl.
*G10L 19/008* (2013.01)
*G10L 25/06* (2013.01)

(52) U.S. Cl.
CPC ............ *G10L 19/008* (2013.01); *G10L 25/06* (2013.01)

(58) Field of Classification Search
USPC .................................................. 704/500–504
See application file for complete search history.

(56) References Cited

U.S. PATENT DOCUMENTS

2010/0280822 A1* 11/2010 Yoshida ................ G10L 19/005 704/201
2011/0081032 A1* 4/2011 Soulodre .................. H04R 5/02 381/300

(Continued)

FOREIGN PATENT DOCUMENTS

AU 2015246158 A1 11/2015
JP 2015011076 A 1/2015

(Continued)

*Primary Examiner* — Leonard Saint-Cyr
(74) *Attorney, Agent, or Firm* — WOMBLE BOND DICKINSON (US) LLP

(57) ABSTRACT

A multi-channel audio signal encoding method includes: obtaining a to-be-encoded first audio frame; obtaining a correlation value set, where the correlation value set includes respective correlation values of a plurality of channel pairs; selecting M correlation values from the correlation value set, where all the M correlation values are greater than correlation values other than the M correlation values in the correlation value set, and all the M correlation values are greater than or equal to a pairing threshold; obtaining M channel pair sets; determining a target channel pair set from the M channel pair sets, where a sum of correlation values of all channel pairs in the target channel pair set is the largest in those of the M channel pair sets; and encoding the first audio frame based on the target channel pair set.

20 Claims, 8 Drawing Sheets

(56) References Cited

U.S. PATENT DOCUMENTS

| | | | | |
|---|---|---|---|---|
| 2012/0020481 | A1* | 1/2012 | Usami | H04R 5/02<br>381/300 |
| 2020/0175999 | A1* | 6/2020 | Wang | G10L 19/22 |
| 2020/0176000 | A1* | 6/2020 | Li | G10L 19/20 |
| 2020/0176001 | A1* | 6/2020 | Wang | G10L 19/22 |
| 2021/0385012 | A1* | 12/2021 | Buethe | G10L 19/005 |
| 2022/0108706 | A1* | 4/2022 | Ravelli | G10L 19/008 |

FOREIGN PATENT DOCUMENTS

| | | | |
|---|---|---|---|
| JP | 2016535316 | A | 11/2016 |
| JP | 2018513402 | A | 5/2018 |
| WO | 2020007719 | A1 | 1/2020 |

* cited by examiner

MULTI-CHANNEL AUDIO SIGNAL ENCODING AND DECODING METHOD AND APPARATUS

CROSS-REFERENCE TO RELATED APPLICATIONS

This application is a continuation of International Application No. PCT/CN2021/106101, filed on Jul. 13, 2021, which claims priority to Chinese Patent Application No. 202010699706.7, filed on Jul. 17, 2020. The disclosures of the aforementioned applications are hereby incorporated by reference in their entireties.

TECHNICAL FIELD

This application relates to audio processing technologies, and in particular, to a multi-channel audio signal encoding and decoding method and apparatus.

BACKGROUND

Multi-channel audio encoding and decoding is a technology of encoding or decoding audio that includes at least two channels. Common multi-channel audio includes 5.1 channel audio, 7.1 channel audio, 7.1.4 channel audio, 22.2 channel audio, and the like.

An MPEG surround (MPS) standard specifies joint encoding for four channels. However, it still requires encoding and decoding methods for the foregoing multi-channel audio signals.

SUMMARY

This application provides a multi-channel audio signal encoding and decoding method and apparatus, to reduce redundancy between channel signals and improve audio encoding efficiency.

According to a first aspect, this application provides a multi-channel audio signal encoding method. The method includes: obtaining a to-be-encoded first audio frame, where the first audio frame includes at least five channel signals; obtaining a correlation value set, where the correlation value set includes respective correlation values of a plurality of channel pairs, one channel pair includes two channel signals of the at least five channel signals, and a correlation value of the channel pair indicates correlation between the two channel signals of the channel pair; selecting M correlation values from the correlation value set, where all the M correlation values are greater than correlation values other than the M correlation values in the correlation value set, all the M correlation values are greater than or equal to a pairing threshold, and M is a positive integer less than or equal to a specified value; obtaining M channel pair sets, where each channel pair set includes at least one of M channel pairs corresponding to the M correlation values, and when the channel pair set includes at least two channel pairs, the at least two channel pairs do not include a same channel signal; determining a target channel pair set from the M channel pair sets, where a sum of correlation values of all channel pairs in the target channel pair set is the largest in those of the M channel pair sets; and encoding the first audio frame based on the target channel pair set.

The first audio frame in this embodiment may be any frame in a to-be-encoded multi-channel audio signal, and the first audio frame includes five or more channel signals. Encoding two highly correlated channel signals can reduce redundancy and improve encoding efficiency. Therefore, in this embodiment, pairing is determined based on a correlation value between two channel signals. To find a channel pair set with the highest correlation as much as possible, correlation values between every two of the at least five channel signals in the first audio frame may be calculated to obtain the correlation value set of the first audio frame. For example, 10 channel pairs in total may be formed for the five channel signals; and correspondingly, the correlation value set may include 10 correlation values. In this embodiment, all correlation values included in the correlation value set may be sorted in descending order, and the first M correlation values ranked top are selected from the correlation values. The M correlation values need to be greater than or equal to the pairing threshold. This is because that a correlation value being less than the pairing threshold indicates that correlation between two channel signals in a channel pair corresponding to the correlation value is low, and there is no need to pair the two channel signals for encoding. To improve encoding efficiency, there is no need to select all correlation values greater than or equal to the pairing threshold. Therefore, an upper limit N of M is set, in other words, a maximum of N correlation values are selected.

In this embodiment, sums of correlation values of a plurality of channel pair sets are obtained as much as possible, and then a channel pair set whose sum of correlation values is the largest is determined as the target channel pair set. In this way, the sum of the correlation values of all the channel pairs included in the target channel pair set is the largest, a quantity of channel pairs is increased as much as possible, redundancy between channel signals is reduced, and audio encoding efficiency is improved.

In an embodiment, the M channel pair sets include a first channel pair set. The obtaining M channel pair sets includes obtaining the first channel pair set. The obtaining the first channel pair set include: adding a first channel pair in the M channel pairs to the first channel pair set, where the first channel pair is any one of the M channel pairs; and when channel pairs other than the associated channel pair in the plurality of channel pairs include a channel pair whose correlation value is greater than the pairing threshold, selecting a channel pair whose correlation value is the largest from the other channel pairs, and adding the channel pair to the first channel pair set, where the associated channel pair includes any one of channel signals included in the channel pair that has been added to the first channel pair set.

In the plurality of channel pairs, a plurality of channel pairs with larger correlation values are separately used as a first channel pair added to the channel pair sets, and then a channel pair corresponding to the largest correlation value in remaining channel pairs is selected to be added to a corresponding channel pair set. The sums of the correlation values of the plurality of channel pair sets are obtained as much as possible, and then the channel pair set whose sum of correlation values is the largest is determined as the target channel pair set. In this way, the sum of the correlation values of all the channel pairs included in the target channel pair set is the largest, the quantity of channel pairs is increased as much as possible, redundancy between channel signals is reduced, and audio encoding efficiency is improved.

In an embodiment, the selecting M correlation values from the correlation value set includes: selecting N correlation values from the correlation value set, where all the N correlation values are greater than correlation values other than the N correlation values in the correlation value set, and N is the specified value; and selecting correlation values greater than or equal to the pairing threshold from the N correlation values, where a quantity of correlation values greater than or equal to the pairing threshold is M.

The M correlation values are greater than or equal to the pairing threshold, and M is a positive integer less than or equal to the specified value (for example, N). In this embodiment, all the correlation values included in the correlation value set may be sorted in descending order, and the first N correlation values ranked top are selected from the correlation values, where the N correlation values may have correlation values less than the pairing threshold. Therefore, the M correlation values greater than or equal to the pairing threshold are selected from the N correlation values. This is because that a correlation value being less than the pairing threshold indicates that correlation between two channel signals in a channel pair corresponding to the correlation value is low, and there is no need to pair the two channel signals for encoding.

In an embodiment, the correlation value is a normalized value.

Normalization processing may include correlation values with greatly different value ranges into a unified range for comparison and processing, to improve operation efficiency.

In an embodiment, when the correlation value of the channel pair is less than the pairing threshold, the correlation value of the channel pair is set to 0.

A smaller correlation value indicates that correlation between two channel signals corresponding to the correlation value is small, and there is no need to pair the two channel signals. Therefore, in this case, the correlation value of the two channel signals is set to 0, to facilitate subsequent calculation and improve operation efficiency.

According to a second aspect, this application provides a multi-channel audio signal encoding method. The method includes: obtaining a to-be-encoded first audio frame, where the first audio frame includes at least five channel signals; obtaining a correlation value set, where the correlation value set includes respective correlation values of a plurality of channel pairs, one channel pair includes two channel signals of the at least five channel signals, and a correlation value of the channel pair indicates correlation between the two channel signals of the channel pair; obtaining a plurality of channel pair sets based on the plurality of channel pairs, where when the channel pair set includes at least two channel pairs, the at least two channel pairs do not include a same channel signal; obtaining, based on the correlation value set, a sum of correlation values of all channel pairs included in each of the plurality of channel pair sets; determining a target channel pair set, where a sum of correlation values of all channel pairs in the target channel pair set is the largest in those of the plurality of channel pair sets; and encoding the first audio frame based on the target channel pair set.

Sums of correlation values of the plurality of channel pair sets are obtained as much as possible, and then a channel pair set whose sum of correlation values is the largest is determined as the target channel pair set. In this way, the sum of the correlation values of all the channel pairs included in the target channel pair set is the largest, a quantity of channel pairs is increased as much as possible, redundancy between channel signals is reduced, and audio encoding efficiency is improved.

In an embodiment, the obtaining a plurality of channel pair sets based on the plurality of channel pairs includes: obtaining the plurality of channel pair sets based on channel pairs other than an uncorrelated channel pair in the plurality of channel pairs, where a correlation value of the uncorrelated channel pair is less than a pairing threshold.

A smaller correlation value indicates that correlation between two channel signals corresponding to the correlation value is small, and there is no need to pair the two channel signals. Therefore, in this case, deleting the correlation value of the two channel signals and a channel pair of the two channel signals can reduce a subsequent calculation amount and improve operation efficiency.

In an embodiment, the correlation value is a normalized value.

Normalization processing may include correlation values with greatly different value ranges into a unified range for comparison and processing, to improve operation efficiency.

In an embodiment, when the correlation value of the channel pair is less than the pairing threshold, the correlation value of the channel pair is set to 0.

A smaller correlation value indicates that correlation between two channel signals corresponding to the correlation value is small, and there is no need to pair the two channel signals. Therefore, in this case, the correlation value of the two channel signals is set to 0, to facilitate subsequent calculation and improve operation efficiency.

According to a third aspect, this application provides a multi-channel audio signal encoding method. The method includes: obtaining a to-be-encoded first audio frame, where the first audio frame includes at least five channel signals; obtaining a correlation value set of the first audio frame, where the correlation value set of the first audio frame includes respective correlation values of a plurality of channel pairs, one channel pair includes two channel signals of the at least five channel signals, and a correlation value of the channel pair indicates correlation between the two channel signals of the channel pair; obtaining a correlation value set of a second audio frame, where the correlation value set of the second audio frame includes respective correlation values of a plurality of channel pairs of the second audio frame, one channel pair includes two channel signals of at least five channel signals of the second audio frame, a correlation value of the channel pair indicates correlation between the two channel signals of the channel pair, and the second audio frame is a previous frame of the first audio frame; determining, based on the correlation value set of the first audio frame and the correlation value set of the second audio frame, whether a target channel pair set of the first audio frame needs to be re-obtained; if the target channel pair set of the first audio frame needs to be re-obtained, obtaining the target channel pair set of the first audio frame by using the method according to any implementation of the first aspect or the second aspect, and encoding the first audio frame based on the target channel pair set; and if the target channel pair set of the first audio frame does not need to be re-obtained, determining a target channel pair set of the second audio frame as the target channel pair set of the first audio frame, and encoding the first audio frame based on the target channel pair set.

A sum of differences between a correlation value set of a current audio frame and a correlation value set of a previous audio frame is obtained, to determine whether a target channel pair set of the current frame needs to be re-obtained, which can greatly reduce a calculation amount and improve encoding efficiency when an audio change is small. Even if the audio change is large and the target channel pair set needs to be re-obtained, sums of correlation values of a plurality of channel pair sets may still be obtained as much as possible, to determine a channel pair set whose sum of correlation values is the largest as the target channel pair set.

In this way, a sum of correlation values of all channel pairs included in the target channel pair set is the largest, a quantity of channel pairs is increased as much as possible, redundancy between channel signals is reduced, and audio encoding efficiency is improved.

In an embodiment, the determining, based on the correlation value set of the first audio frame and the correlation value set of the second audio frame, whether a target channel pair set of the first audio frame needs to be re-obtained includes: calculating an absolute value of a difference between correlation values corresponding to a same channel pair in the correlation value set of the first audio frame and the correlation value set of the second audio frame; calculating a sum of absolute values corresponding to the plurality of channel pairs; and when the sum of the absolute values is less than a change threshold, determining that the target channel pair set of the first audio frame does not need to be re-obtained; or when the sum of the absolute values is greater than or equal to the change threshold, determining that the target channel pair set of the first audio frame needs to be re-obtained. The change threshold may be, for example, $\alpha \times$a quantity of channel pairs. A value of $\alpha$ may be 0.14 or 0.15, and the quantity of channel pairs means a quantity of channel pairs included in the correlation value set of the first audio frame (or the correlation value set of the second audio frame).

According to a fourth aspect, this application provides a multi-channel audio signal encoding method. The method includes: obtaining a to-be-encoded first audio frame, where the first audio frame includes K channel signals, and K is an integer greater than or equal to 5; when K is greater than a channel signal quantity threshold, encoding the first audio frame by using the method according to any implementation of the first aspect; and when K is less than or equal to the channel signal quantity threshold, encoding the first audio frame by using the method according to any implementation of the second aspect. The channel signal quantity threshold may be, for example, 5, 6, or 7.

A difference between the method in this application and the method in the first aspect or the second aspect is that the method in the first aspect and the method in the second aspect are used together, in other words, a method used for obtaining the target channel pair set of the first audio frame is determined based on a quantity of channel signals included in the first audio frame. When the first audio frame includes a large quantity of channel signals, if the method in the second aspect is used, all target channel pair sets need to be exhaustively listed, which increases a calculation amount. Therefore, in this case, when the method in the first aspect is used, a lot of calculation amounts are reduced. When the first audio frame includes a small quantity of channel signals, a sum of correlation values of all channel pair sets may be obtained by using the method in the second aspect, to ensure that a finally selected target channel pair set is definitely an optimal result that best meets a feature of the first audio frame.

According to a fifth aspect, this application provides an encoding apparatus. The encoding apparatus includes: an obtaining module, configured to: obtain a to-be-encoded first audio frame, where the first audio frame includes at least five channel signals; obtain a correlation value set, where the correlation value set includes respective correlation values of a plurality of channel pairs, one channel pair includes two channel signals of the at least five channel signals, and a correlation value of the channel pair indicates correlation between the two channel signals of the channel pair; select M correlation values from the correlation value set, where all the M correlation values are greater than correlation values other than the M correlation values in the correlation value set, all the M correlation values are greater than or equal to a pairing threshold, and M is a positive integer less than or equal to a specified value; and obtain M channel pair sets, where each channel pair set includes at least one of M channel pairs corresponding to the M correlation values, and when the channel pair set includes at least two channel pairs, the at least two channel pairs do not include a same channel signal; a determining module, configured to determine a target channel pair set from the M channel pair sets, where a sum of correlation values of all channel pairs in the target channel pair set is the largest in those of the M channel pair sets; and an encoding module, configured to encode the first audio frame based on the target channel pair set.

In an embodiment, the M channel pair sets include a first channel pair set. The obtaining module is configured to: add a first channel pair in the M channel pairs to the first channel pair set, where the first channel pair is any one of the M channel pairs; and when channel pairs other than the associated channel pair in the plurality of channel pairs include a channel pair whose correlation value is greater than the pairing threshold, select a channel pair whose correlation value is the largest from the other channel pairs, and add the channel pair to the first channel pair set, where the associated channel pair includes any one of channel signals included in the channel pair that has been added to the first channel pair set.

In an embodiment, the obtaining module is configured to: select N correlation values from the correlation value set, where all the N correlation values are greater than correlation values other than the N correlation values in the correlation value set, and N is the specified value; and select correlation values greater than or equal to the pairing threshold from the N correlation values, where a quantity of correlation values greater than or equal to the pairing threshold is M.

In an embodiment, the correlation value is a normalized value.

In an embodiment, when the correlation value of the channel pair is less than the pairing threshold, the correlation value of the channel pair is set to 0.

According to a sixth aspect, this application provides an encoding apparatus. The encoding apparatus includes: an obtaining module, configured to: obtain a to-be-encoded first audio frame, where the first audio frame includes at least five channel signals; obtain a correlation value set, where the correlation value set includes respective correlation values of a plurality of channel pairs, one channel pair includes two channel signals of the at least five channel signals, and a correlation value of the channel pair indicates correlation between the two channel signals of the channel pair; obtain a plurality of channel pair sets based on the plurality of channel pairs, where when the channel pair set includes at least two channel pairs, the at least two channel pairs do not include a same channel signal; and obtain, based on the correlation value set, a sum of correlation values of all channel pairs included in each of the plurality of channel pair sets; a determining module, configured to determine a target channel pair set, where a sum of correlation values of all channel pairs in the target channel pair set is the largest in those of the plurality of channel pair sets; and an encoding module, configured to encode the first audio frame based on the target channel pair set.

In an embodiment, the obtaining module is configured to obtain the plurality of channel pair sets based on channel pairs other than an uncorrelated channel pair in the plurality of channel pairs, where a correlation value of the uncorrelated channel pair is less than a pairing threshold.

In an embodiment, the correlation value is a normalized value.

In an embodiment, when the correlation value of the channel pair is less than the pairing threshold, the correlation value of the channel pair is set to 0.

According to a seventh aspect, this application provides an encoding apparatus. The encoding apparatus includes: an obtaining module, configured to: obtain a to-be-encoded first audio frame, where the first audio frame includes at least five channel signals; obtain a correlation value set of the first audio frame, where the correlation value set of the first audio frame includes respective correlation values of a plurality of channel pairs, one channel pair includes two channel signals of the at least five channel signals, and a correlation value of the channel pair indicates correlation between the two channel signals of the channel pair; and obtain a correlation value set of a second audio frame, where the correlation value set of the second audio frame includes respective correlation values of a plurality of channel pairs of the second audio frame, one channel pair includes two channel signals of at least five channel signals of the second audio frame, a correlation value of the channel pair indicates correlation between the two channel signals of the channel pair, and the second audio frame is a previous frame of the first audio frame; and an encoding module, configured to: determine, based on the correlation value set of the first audio frame and the correlation value set of the second audio frame, whether a target channel pair set of the first audio frame needs to be re-obtained; if the target channel pair set of the first audio frame needs to be re-obtained, obtain the target channel pair set of the first audio frame by using the method according to any implementation of the first aspect, and encode the first audio frame based on the target channel pair set; and if the target channel pair set of the first audio frame does not need to be re-obtained, determine a target channel pair set of the second audio frame as the target channel pair set of the first audio frame, and encode the first audio frame based on the target channel pair set.

In an embodiment, the encoding module is configured to: calculate an absolute value of a difference between correlation values corresponding to a same channel pair in the correlation value set of the first audio frame and the correlation value set of the second audio frame; calculate a sum of the absolute values corresponding to the plurality of channel pairs; and when the sum of the absolute values is less than a change threshold, determine that the target channel pair set of the first audio frame does not need to be re-obtained; or when the sum of the absolute values is greater than or equal to the change threshold, determine that the target channel pair set of the first audio frame needs to be re-obtained.

According to an eighth aspect, this application provides an encoding apparatus. The encoding apparatus includes: an obtaining module, configured to obtain a to-be-encoded first audio frame, where the first audio frame includes K channel signals, and K is an integer greater than or equal to 5; and an encoding module, configured to: when K is greater than a channel signal quantity threshold, perform the method according to any implementation of the first aspect to encode the first audio frame; and when K is less than or equal to the channel signal quantity threshold, perform the method according to any implementation of the second aspect to encode the first audio frame.

According to a ninth aspect, this application provides a device, including one or more processors; and a memory, configured to store one or more programs. When the one or more programs are executed by the one or more processors, the one or more processors are enabled to implement the method according to any implementation of the first to the fourth aspects.

According to a tenth aspect, this application provides a computer-readable storage medium including a computer program. When the computer program is executed on a computer, the computer is enabled to perform the method according to any implementation of the first to fourth aspects.

According to an eleventh aspect, this application provides a computer-readable storage medium, where the computer-readable storage medium includes an encoded bitstream obtained based on the multi-channel audio signal encoding method according to any implementation of the first to the fourth aspects.

DESCRIPTION OF EMBODIMENTS

Figure 1:
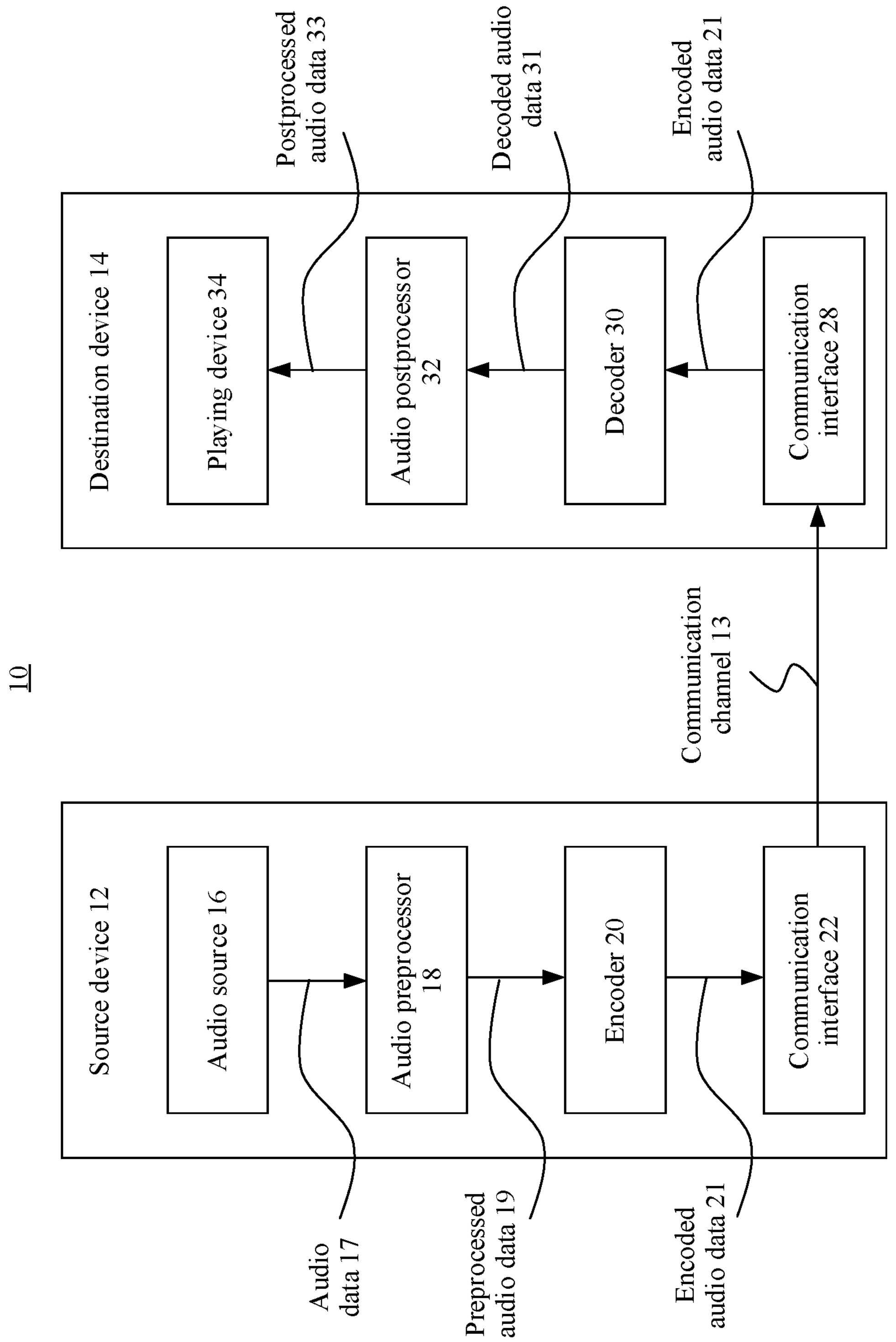
FIG. 1 is an example of a schematic block diagram of an audio coding system 10 to which this application is applied.

To make the objectives, technical solutions, and advantages of this application clearer, the following clearly describes the technical solutions in this application with reference to the accompanying drawings in this application. It is clear that, the described embodiments are merely some rather than all of the embodiments of this application. All other embodiments obtained by persons of ordinary skill in the art based on embodiments of this application without creative efforts shall fall within the protection scope of this application.

In the specification, embodiments, claims, and accompanying drawings of this application, terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that in this application, “at least one (item)” means one or more and “a plurality of” means two or more. “And/or” is used to describe an association relationship between associated objects, and indicates that three relationships may exist. For example, “A and/or B” may indicate that only A exists, only B exists, and both A and B exist. Herein, A or B may be singular or plural. The character “/” usually indicates an “or” relationship between the associated objects. In addition, “at least one of the following items (pieces)” or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Explanations of related terms in this application are as follows:

Audio frame: Audio data is in a stream form. In an actual application, to facilitate audio processing and transmission, an audio data amount within one duration is usually selected as a frame of audio. The duration is referred to as a “sampling time period”, and a value of the duration may be determined based on a requirement of a codec and a specific application, for example, the duration ranges from 2.5 ms to 60 ms, where ms is millisecond.

Audio signal: The audio signal is a frequency and amplitude change information carrier of a regular sound wave with voice, music, and sound effect. Audio is a continuously changing analog signal, and can be represented by a continuous curve and referred to as a sound wave. A digital signal generated from the audio through analog-to-digital conversion or by using a computer is an audio signal. The sound wave has three important parameters: frequency, amplitude, and phase, which determine characteristics of the audio signal.

Channel signals are independent audio signals that are collected or played in different spatial positions during sound recording or playing. Therefore, a quantity of channels is a quantity of audio sources used during audio recording, or a quantity of loudspeakers used for audio playing.

The following is a system architecture to which this application is applied.

FIG. 1 is an example of a schematic block diagram of an audio coding system 10 to which this application is applied. As shown in FIG. 1, the audio coding system 10 may include a source device 12 and a destination device 14. The source device 12 generates an encoded bitstream. Therefore, the source device 12 may be referred to as an audio encoding apparatus. The destination device 14 may decode the encoded bitstream generated by the source device 12. Therefore, the destination device 14 may be referred to as an audio decoding apparatus.

The source device 12 includes an encoder 20, and in an embodiment, may include an audio source 16, an audio preprocessor 18, and a communication interface 22.

The audio source 16 may include or may be any type of audio capture device configured to capture real-world speech, music, sound effect, and the like; and/or any type of audio generation device, for example, an audio processor or device configured to generate speech, music, and sound effect. The audio source may be any type of memory or storage that stores the foregoing audio.

The audio preprocessor 18 is configured to receive (original) audio data 17, and preprocess the audio data 17 to obtain preprocessed audio data 19. For example, preprocessing performed by the audio preprocessor 18 may include pruning or noise reduction. It may be understood that the audio preprocessor 18 may be an optional component.

The encoder 20 is configured to receive the preprocessed audio data 19 and provide encoded audio data 21.

The communication interface 22 in the source device 12 may be configured to receive the encoded audio data 21 and send the encoded audio data 21 to the destination device 14 through a communication channel 13, to store or directly reconstruct the encoded audio data 21.

The destination device 14 includes a decoder 30, and in an embodiment, may include a communication interface 28, an audio postprocessor 32, and a playing device 34.

The communication interface 28 in the destination device 14 is configured to directly receive the encoded audio data 21 from the source device 12, and provide the encoded audio data 21 to the decoder 30.

The communication interface 22 and the communication interface 28 may be configured to use a direct communication link between the source device 12 and the destination device 14, for example, a direct wired or wireless connection; or use any type of network, for example, a wired network, a wireless network, or any combination thereof, any type of private network and public network, or any type of combination thereof, to send or receive the encoded audio data 21.

For example, the communication interface 22 may be configured to encapsulate the encoded audio data 21 into a suitable format such as a packet, and/or process the encoded audio data 21 through any type of transmission encoding or processing, to be transmitted over a communication link or a communication network.

The communication interface 28 corresponds to the communication interface 22. For example, the communication interface 28 may be configured to receive transmitted data, and process the transmitted data through any type of corresponding transmission decoding or processing and/or decapsulation, to obtain the encoded audio data 21.

The communication interface 22 and the communication interface 28 each may be configured as a unidirectional communication interface or a bidirectional communication interface indicated by an arrow that is of the corresponding communication channel 13 and that points from the source device 12 to the destination device 14 in FIG. 1; and may be configured to send and receive a message, or the like, to establish a connection, confirm and exchange any other information related to data transmission such as a communication link and/or encoded audio data.

The decoder 30 is configured to receive the encoded audio data 21 and provide decoded audio data 31.

The audio postprocessor 32 is configured to perform postprocessing on the decoded audio data 31 to obtain postprocessed audio data 33. Post-processing performed by the audio postprocessor 32 may include, for example, pruning or resampling.

The playing device 34 is configured to receive the postprocessed audio data 33, to play audio to a user or a listener. The playing device 34 may be or include any type of player configured to play reconstructed audio, for example, an integrated or external loudspeaker. For example, the loudspeaker may include a horn, a speaker, and the like.

Figure 2:
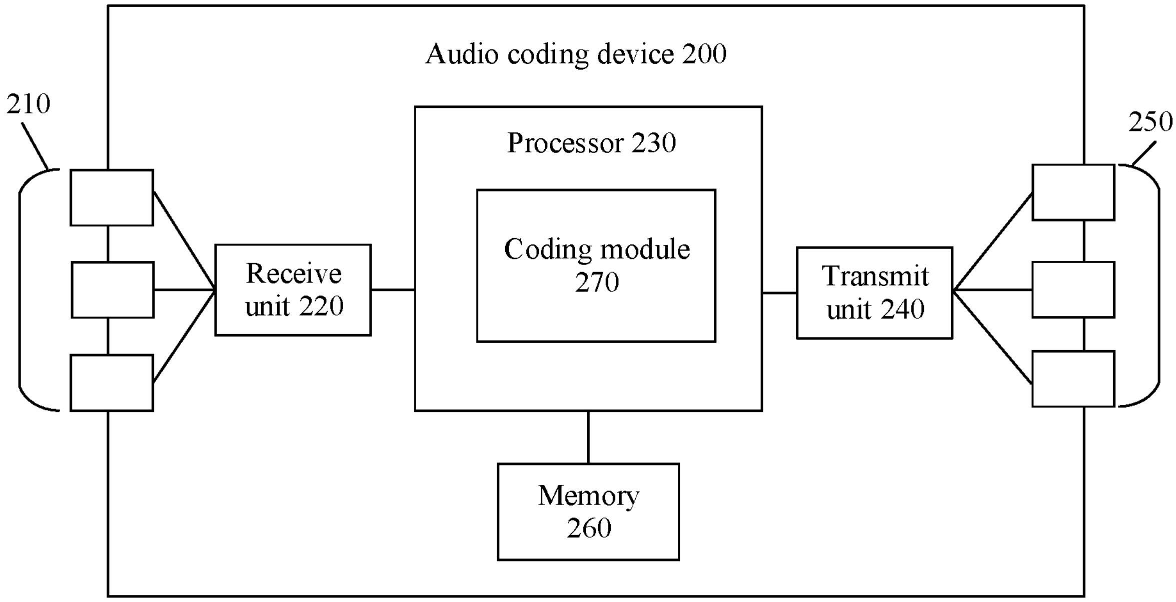
FIG. 2 is an example of a schematic block diagram of an audio coding device 200 to which this application is applied.

FIG. 2 is an example of a schematic block diagram of an audio coding device 200 to which this application is applied. In an embodiment, the audio coding device 200 may be an audio decoder (for example, the decoder 30 in FIG. 1) or an audio encoder (for example, the encoder 20 in FIG. 1).

The audio coding device 200 includes an ingress port 210 and a receive unit (Rx) 220 for receiving data; a processor, a logic unit, or a central processing unit 230 for processing data; a transmit unit (Tx) 240 and an egress port 250 for transmitting data; and a memory 260 for storing data. The audio coding device 200 may further include an optical-to-electrical conversion component and an electrical-to-optical (EO) component coupled to the ingress port 210, the receive unit 220, the transmit unit 240, and the egress port 250. The components are configured as ingress ports or egress ports of an optical signal or an electrical signal.

The central processing unit 230 is implemented through hardware and software. The central processing unit 230 may be implemented as one or more CPU chips, cores (for example, a multi-core processor), FPGAs, ASICs, and DSPs. The central processing unit 230 communicates with the ingress port 210, the receive unit 220, the transmit unit 240, the egress port 250, and the memory 260. The central processing unit 230 includes a coding module 270 (for example, an encoding module or a decoding module). The coding module 270 implements the embodiments disclosed in this application, to implement the multi-channel audio signal encoding and decoding method provided in this application. For example, the coding module 270 implements, processes, or provides various encoding operations. Therefore, the coding module 270 substantially improves functions of the audio coding device 200, and affects conversion of the audio coding device 200 to different states. Alternatively, the coding module 270 is implemented by using instructions stored in the memory 260 and executed by the central processing unit 230.

The memory 260 includes one or more disks, tape drives, and solid state drives, and may be used as an overflow data storage device, to store programs when such programs are selected for execution, and to store instructions and data that are read during program execution. The memory 260 may be volatile and/or nonvolatile, and may be a read-only memory (ROM), a random access memory (RAM), a ternary content-addressable memory (TCAM), and/or a static random access memory (SRAM).

Based on the description of the foregoing embodiments, this application provides a multi-channel audio signal encoding and decoding method.

Figure 3:
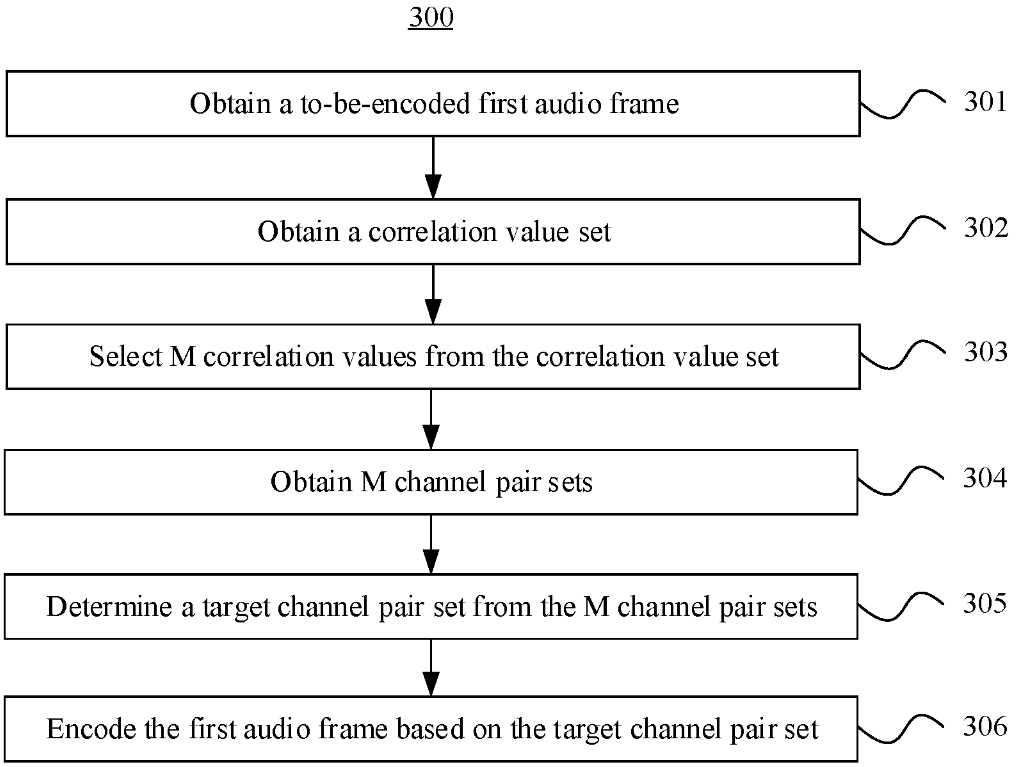
FIG. 3 is a flowchart of an example embodiment of a multi-channel audio signal encoding method according to this application.

FIG. 3 is a flowchart of an example embodiment of a multi-channel audio signal encoding method according to this application. A process 300 may be executed by the source device 12 in the audio coding system 10 or the audio coding device 200. The process 300 includes a series of steps or operations. It should be understood that the process 300 may be performed in various sequences and/or simultaneously, and is not limited to an execution sequence shown in FIG. 3. As shown in FIG. 3, the method includes the following operations.

Operation 301: Obtain a to-be-encoded first audio frame.

The first audio frame in this embodiment may be any frame in a to-be-encoded multi-channel audio signal, and the first audio frame includes five or more channel signals. For example, 5.1 channels include six channel signals: a center (C) channel signal, a left (L) channel signal, a right (R) channel signal, a left surround (LS) channel signal, a right surround (RS) channel signal, and a 0.1 channel low frequency effects (LFE) channel signal. 7.1 channels include eight channel signals: a C channel signal, an L channel signal, an R channel signal, an LS channel signal, an RS channel signal, an LB channel signal, an RB channel signal, and an LFE channel signal. An LFE channel is an audio channel ranging from 3 Hz to 120 Hz, which is usually sent to a loudspeaker specially designed for low tones.

Operation 302: Obtain a correlation value set.

The correlation value set includes respective correlation values of a plurality of channel pairs, one channel pair includes two channel signals of the at least five channel signals, and a correlation value of the channel pair indicates correlation between the two channel signals of the channel pair. In an embodiment, the plurality of channel pairs may include all channel pairs corresponding to the at least five channel signals, or the plurality of channel pairs may include some channel pairs corresponding to the at least five channel signals. This is not limited.

Encoding two highly correlated channel signals can reduce redundancy and improve encoding efficiency. Therefore, in this embodiment, pairing is determined based on a correlation value between the two channel signals. To find a channel pair set with the highest correlation as much as possible, correlation values between every two of the at least five channel signals in the first audio frame may be first calculated to obtain the correlation value set of the first audio frame. For example, 10 channel pairs in total may be formed for the five channel signals; and correspondingly, the correlation value set may include 10 correlation values.

In an embodiment, the correlation values may be normalized, so that the correlation values of all the channel pairs are limited within a specific range, to set a unified criterion for determining the correlation values, for example, a pairing threshold. The pairing threshold may be set to a value greater than or equal to 0.2 and less than or equal to 1. For example, the pairing threshold may be 0.3, 0.4, or 0.35. In this way, two channel signals are lowly correlated as long as a normalized correlation value between the two channel signals is less than the pairing threshold, and there is no need to pair the two channel signals for encoding.

In an embodiment, the correlation value between the two channel signals (for example, ch1 and ch2) may be calculated according to the following formula:

$$\mathrm{corr\_norm}(ch1, ch2) = \frac{\sum_{i=1}^{N}(\mathrm{spec\_ch1}(i) \times \mathrm{spec\_ch2}(i))}{\sqrt{\sum_{i=1}^{N}(\mathrm{spec\_ch1}(i) \times \mathrm{spec\_ch1}(i)) \times \sum_{i=1}^{N}(\mathrm{spec\_ch2}(i) \times \mathrm{spec\_ch2}(i))}}$$

corr_norm (ch1, ch2) indicates a normalized correlation value between the channel signal ch1 and the channel signal ch2, spec_ch1(i) indicates a frequency-domain coefficient of an $i^{th}$ frequency of the channel signal ch1, spec_ch2(i) is a frequency-domain coefficient of an $i^{th}$ frequency of the channel signal ch2, and N indicates a total quantity of frequencies of an audio frame.

It should be noted that another algorithm or formula may also be used to calculate the correlation value between the two channel signals. This is not limited in this application.

In some embodiments, the correlation value calculated according to the foregoing algorithm or formula may be used as an initial correlation value, and then whether the initial correlation value needs to be modified is determined based on a preset condition. For example, the preset condition may include calculating whether an amplitude ratio between the two channel signals related to the initial correlation value is greater than a preset pairing threshold. When the amplitude ratio is greater than the pairing threshold, the initial correlation value is modified. When the amplitude ratio is less than or equal to the pairing threshold, the initial correlation value remains unchanged. Modification may be decreasing the initial correlation value. For example, the initial correlation value may be directly modified to 0, to prevent the two channel signals from being paired for processing.

For example, an amplitude level(ch) of a current frame of a channel signal ch may be obtained through calculation according to the following formula:

$$level(ch) = \sqrt[2]{\sum_{i=1}^{N} \text{spec\_coeff}(ch, i) \times \text{spec\_coeff}(ch, i)}$$

i indicates an $i^{th}$ sampling point of the current frame of the channel signal ch, N indicates a total quantity of sampling points of the current frame, and sepc_coeff (ch, i) is a frequency-domain coefficient of the $i^{th}$ sampling point of the current frame.

It is assumed that a pairing amplitude threshold is ThreholdCoupling=2. When $$\frac{level(ch1)}{level(ch2)} >$$

ThreholdCoupling or $$\frac{level(ch2)}{level(ch1)} >$$

ThreholdCoupling, corr_norm (ch1, ch2) is set to 0, so that ch1 and ch2 are not paired.

Operation 303: Select M correlation values from the correlation value set.

All the M correlation values are greater than correlation values other than the M correlation values in the correlation value set, all the M correlation values are greater than or equal to the pairing threshold, and M is a positive integer less than or equal to a specified value (for example, N). In this embodiment, all correlation values included in the correlation value set may be sorted in descending order, and the first M correlation values ranked top are selected from the correlation values. The M correlation values need to be greater than or equal to the pairing threshold. This is because that a correlation value being less than the pairing threshold indicates that correlation between two channel signals in a channel pair corresponding to the correlation value is low, and there is no need to pair the two channel signals for encoding. To improve encoding efficiency, there is no need to select all correlation values greater than or equal to the pairing threshold. Therefore, an upper limit N of M is set, in other words, a maximum of N correlation values are selected.

N may be an integer greater than or equal to 2, and a maximum value of N cannot exceed a quantity of all channel pairs corresponding to all channel signals of the first audio frame. A larger value of N indicates an increase in a calculation amount. A smaller value of N indicates that a channel pair set may be lost, and encoding efficiency is reduced.

In an embodiment, N may be set to the largest quantity of channel pairs plus one, that is, $$N = \left\lfloor \frac{CH}{2} \right\rfloor + 1,$$

where CH indicates a quantity of channel signals included in the first audio frame. For example, if the 5.1 channels include five channel signals (the LFE channel is not considered), N=3; and if the 7.1 channels include seven channel signals (the LFE channel is not considered), N=4.

If the correlation value set does not include a correlation value greater than or equal to the pairing threshold, subsequent operations do not need to be performed, and mono-channel encoding is performed on each channel signal of the first audio frame. If the M correlation values are selected from the correlation value set, the following operations may be performed.

Operation 304: Obtain M channel pair sets.

Each channel pair set includes at least one of the M channel pairs corresponding to the M correlation values; and when the channel pair set includes at least two channel pairs, the at least two channel pairs do not include a same channel signal. For example, for the 5.1 channels, three channel pairs (L, R), (R, C), and (LS, RS) corresponding to the largest correlation value are selected based on the correlation value set. A correlation value of (LS, RS) is less than the pairing threshold, and therefore is excluded. In this case, two channel pair sets may be obtained for the two channel pairs (L, R) and (R, C). One of the two channel pair sets includes (L, R), and the other includes (R, C).

Any one (for example, a first channel pair) of the M channel pairs corresponding to the M correlation values is used as an example. The method for obtaining the M channel pair sets in this embodiment may include: adding the first channel pair to a first channel pair set, where the M channel pair sets include the first channel pair set; and when channel pairs other than the associated channel pair in the plurality of channel pairs include a channel pair whose correlation value is greater than the pairing threshold, selecting a channel pair whose correlation value is the largest from the other channel pairs, and adding the channel pair to the first channel pair set, where the associated channel pair includes any one of channel signals included in the channel pair that has been added to the first channel pair set.

Except the operation of adding the first channel pair to the first channel pair set, all the foregoing processes are iterative processing operations. To be specific, a. determining whether the channel pairs other than the associated channel pair in the plurality of channel pairs include the channel pair whose correlation value is greater than the pairing threshold; and
b. if the channel pair whose correlation value is greater than the pairing threshold is included, selecting the channel pair whose correlation value is the largest from the other channel pairs, and adding the channel pair to the first channel pair set.

In this case, as long as the other channel pairs include a channel pair whose correlation value is greater than the pairing threshold, operation b may be performed iteratively.

In an embodiment, to reduce a calculation amount, correlation values less than the pairing threshold may be deleted from the correlation value set. In this way, a quantity of channel pairs may be reduced, and a quantity of iterations may be further reduced.

Operation 305: Determine a target channel pair set from the M channel pair sets.

A sum of correlation values of all channel pairs in the target channel pair set is the largest in those of the M channel pair sets. After the M channel pair sets are obtained, a sum of correlation values of all channel pairs included in each channel pair set may be calculated, and finally the channel pair set whose sum of correlation values is the largest is determined as the target channel pair set.

Operation 306: Encode the first audio frame based on the target channel pair set.

Figure 4:
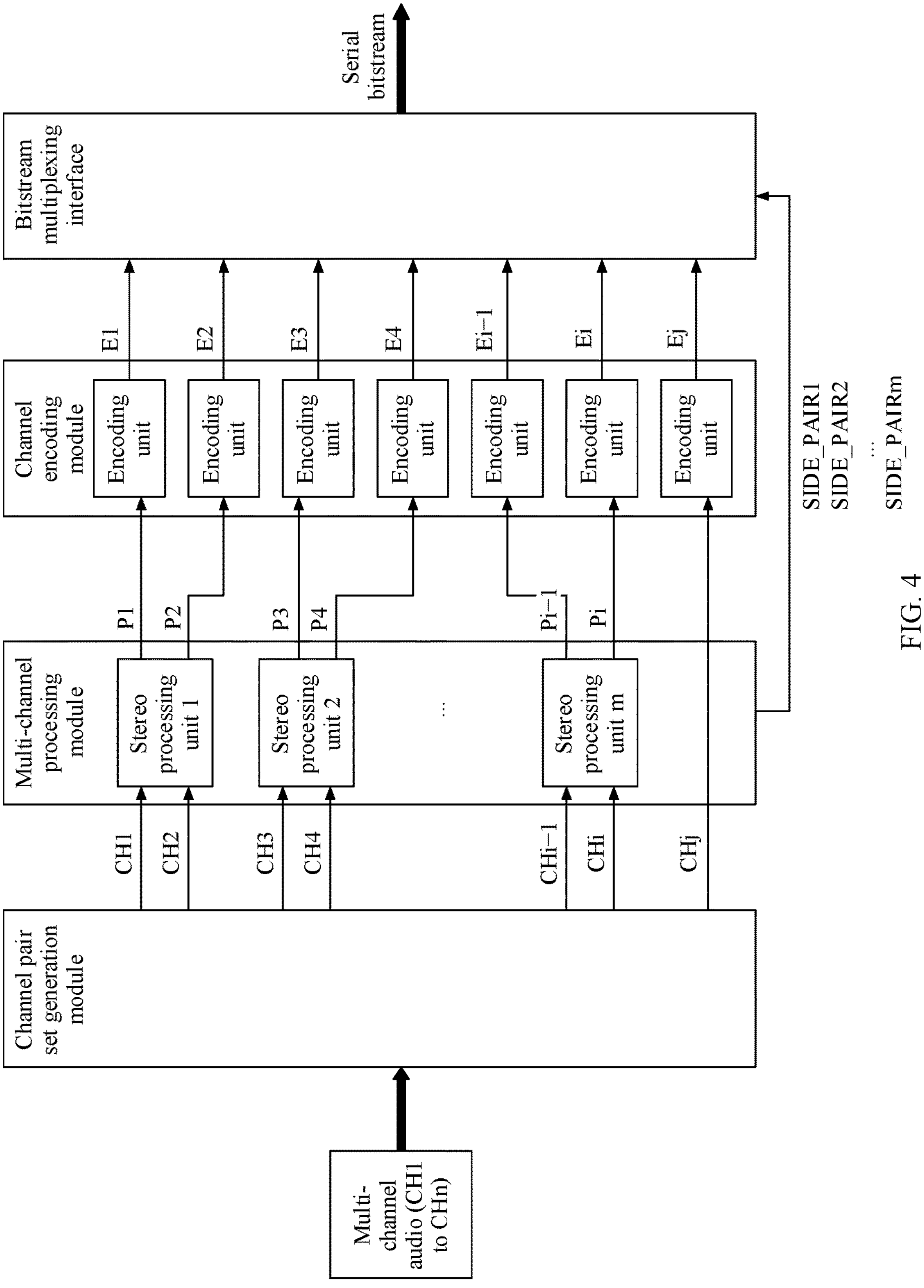
FIG. 4 is an example diagram of a structure of an encoding apparatus to which a multi-channel audio signal encoding method is applied according to this application.

For a process of encoding the first audio frame based on the target channel pair set, refer to the following embodiment shown in FIG. 4. Details are not described herein again.

In an embodiment, in this embodiment, before encoding the first audio frame, especially before stereo processing is performed on the at least five channel signals in the first audio frame, energy balancing processing may be separately performed on the at least five channel signals in the first audio frame to obtain at least five equalized channel signals. Then, stereo processing is performed on the at least five equalized channel signals. In this case, an encoding object is related to the equalized channel signal.

An energy balancing mode may include a first energy balancing mode and/or a second energy balancing mode. In the first energy balancing mode, only two channel signals in one channel pair are used to obtain two equalized channel signals corresponding to the channel pair. In the second energy balancing mode, two channel signals in one channel pair and at least one channel signal of another channel pair are used to obtain two equalized channel signals corresponding to the channel pair.

When the energy balancing mode is the first energy balancing mode, for a current channel pair in the target channel pair set, an average value of energy or amplitude values of two channel signals included in the current channel pair may be calculated, and energy balancing processing is separately performed on the two channel signals based on the average value to obtain two corresponding equalized channel signals. In this way, when fluctuation interval values of the at least five channel signals are large, energy balancing may be performed only between two related channel signals, so that bit allocation during stereo processing better complies with energy features of the channel signals. In this way, a problem that in an encoding environment with a low bit rate, encoding noise of a channel pair with high energy may be far greater than encoding noise of a channel pair with low energy due to insufficient bits, and bits of the channel pair with low energy may be redundant is avoided.

When the energy balancing mode is the second energy balancing mode, an average value of energy or amplitude values of the at least five channel signals may be calculated, and energy balancing processing is separately performed on the at least five channel signals based on the average value to obtain at least five equalized channel signals.

In this embodiment, sums of correlation values of a plurality of channel pair sets are obtained as much as possible, and then a channel pair set whose sum of correlation values is the largest is determined as the target channel pair set. In this way, the sum of the correlation values of all the channel pairs included in the target channel pair set is the largest, a quantity of channel pairs is increased as much as possible, redundancy between channel signals is reduced, and audio encoding efficiency is improved.

The following describes, by using two specific embodiments, a process of obtaining the target channel pair set in the method embodiment shown in FIG. 3.

FIG. 4 is an example diagram of a structure of an encoding apparatus to which a multi-channel audio signal encoding method is applied according to this application. The encoding apparatus may be the encoder 20 of the source device 12 in the audio coding system 10, or may be the coding module 270 in the audio coding device 200. The encoding apparatus may include a channel pair set generation module, a multi-channel processing module, a channel encoding module, and a bitstream multiplexing interface.

Inputs of the channel pair set generation module are n channel signals (CH1 to CHn) of multi-channel audio, where n is an integer greater than or equal to 5. Stereo processing can be performed on all the n channel signals. The channel pair set generation module calculates a correlation value between any two channel signals in the n channel signals, to obtain a target channel pair set based on correlation values by using the method in the embodiment shown in FIG. 3, for example, (CH1, CH2), (CH3, CH4), . . . , and (CHi−1, CHi).

The multi-channel processing module includes a plurality of stereo processing units. The stereo processing units may use prediction-based or Karhunen-Loeve transform (KLT)-based processing. To be specific, two input channel signals are rotated (for example, by using a 2×2 rotation matrix) to maximize energy compression, so that signal energy is concentrated in one channel.

Each channel pair in the target channel pair set output by the channel pair set generation module is input to a stereo processing unit. For example, (CH1, CH2) is input to a stereo processing unit 1, (CH3, CH4) is input to a stereo processing unit 2, . . . , and (CHi−1, Chi) is input to a stereo processing unit m. After processing the input two channel signals, the stereo processing unit outputs processed channel signals (P) corresponding to the two channel signals and a multi-channel parameter (SIDE_PAIR), where the multi-channel parameter includes a channel pair index, energy equalization auxiliary information, and stereo processing auxiliary information. For example, the stereo processing unit 1 processes CH1 and CH2 to obtain P1, P2, and SIDE_PAIR1; the stereo processing unit 2 processes CH3 and CH4 to obtain P3, P4, and SIDE_PAIR2; . . . ; and the stereo processing unit m processes CHi−1 and CHi to obtain Pi−1, Pi, and SIDE_PAIRm.

The channel encoding module uses mono-channel encoding units (or mono-channel channel boxes or mono-channel tools) to encode the processed channel signals output by the multi-channel processing module, and outputs corresponding encoded channel signals (E). In the process of encoding the channel signals by the mono-channel encoding units, more bits are allocated to a channel signal with higher energy (or a higher amplitude), and fewer bits are allocated to a channel signal with lower energy (or a lower amplitude). In an embodiment, the channel encoding module may also use stereo encoding units, for example, parametric stereo encoders or lossy stereo encoders, to encode the processed channel signals output by the multi-channel processing module. For example, P1, P2, P3, P4, . . . , Pi−1, and Pi are encoded by using the mono-channel encoding units to obtain E1, E2, E3, E4, Ei−1, and Ei.

It should be noted that a channel signal (for example, CHj) that is not paired in the channel pair set generation module do not need to be processed by a stereo processing unit in the multi-channel processing module, and may be directly input to a mono-channel encoding unit in the channel encoding module to obtain Ej.

The bitstream multiplexing interface generates encoded multi-channel signals, where the encoded multi-channel signals include the encoded channel signals output by the channel encoding module and the multi-channel parameters output by the multi-channel processing module. For example, the encoded multi-channel signals include E1, E2, E3, E4, . . . , Ei−1, and Ei; and SIDE_PAIR1, SIDE_PAIR2, . . . , and SIDE_PAIRm. In an embodiment, the bitstream multiplexing interface may process the encoded multi-channel signals into serial signals or serial bitstreams.

As described above, a processing procedure of obtaining the target channel pair set provided in this application may be implemented by the channel pair set generation module in the encoding apparatus shown in FIG. 4.

Embodiment 1

The 5.1 channels are used as examples. The 5.1 channels include the center (C) channel, the left (L) channel, the right (R) channel, the left surround (LS) channel, the right surround (RS) channel, and the 0.1 channel low frequency effects (LFE) channel. For these channels, the channel pair set generation module may use a multi-channel mask to remove a channel that does not require multi-channel processing, to improve encoding efficiency. The LFE channel may be removed from the 5.1 channels. Therefore, channel signals input to the channel pair set generation module include a C channel signal, an L channel signal, an R channel signal, an LS channel signal, and an RS channel signal. The method for obtaining the target channel pair set may include the following operations.

(1) Calculating a Correlation Value Between any Two of the Five Channel Signals.

In this application, the correlation value between the two channel signals (for example, the channel signal ch1 and the channel signal ch2) may be calculated according to the following formula:

$$\text{corr\_norm}(ch1, ch2) = \frac{\sum_{i=1}^{N}(\text{spec\_ch1}(i)\times\text{spec\_ch2}(i))}{\sqrt{\sum_{i=1}^{N}(\text{spec\_ch1}(i)\times\text{spec\_ch1}(i))\times\sum_{i=1}^{N}(\text{spec\_ch2}(i)\times\text{spec\_ch2}(i))}}$$

corr_norm (ch1, ch2) indicates the normalized correlation value between the channel signal ch1 and the channel signal ch2, spec_ch1(i) indicates the frequency-domain coefficient of the $i^{th}$ frequency of the channel signal ch1, spec_ch2(i) is the frequency-domain coefficient of the $i^{th}$ frequency of the channel signal ch2, and N indicates the total quantity of frequencies of an audio frame.

In this embodiment, there are five channel signals in pairing in the 5.1 channels. Therefore, the obtained correlation value set may include correlation values of a maximum of $$T = 5 \times \frac{5-1}{2} = 10$$

channel pairs. Table 1 shows an example of the correlation value set of the 5.1 channels.

TABLE 1

| Channel signal/ Correlation value | R | C | LS | RS |
|---|---|---|---|---|
| L | 0.36 | 0.47 | 0.39 | 0.27 |
| R | | 0.57 | 0.22 | 0.08 |
| C | | | 0.31 | 0.26 |
| LS | | | | 0.42 |

The pairing threshold is set to 0.3, and only two channel signals whose correlation value is greater than 0.3 can be paired. Therefore, Table 1a may be obtained by deleting correlation values less than the pairing threshold from Table 1. In this way, channel signals with low correlation may not be considered in an iterative processing process, and a calculation amount is reduced.

TABLE 1a

| Channel signal/ Correlation value | R | C | LS | RS |
|---|---|---|---|---|
| L | 0.36 | 0.47 | 0.39 | ~~0.27~~ |
| R | | 0.57 | ~~0.22~~ | ~~0.08~~ |
| C | | | 0.31 | ~~0.26~~ |
| LS | | | | 0.42 |

N is set to a maximum quantity of channel pairs plus one, that is, $$N = \left\lfloor \frac{5}{2} \right\rfloor + 1 = 3.$$

N=3 maximum correlation values are selected from Table 1a, for example, 0.57 (R, C), 0.47 (L, C) and 0.42 (LS, RS) in descending order, and the three correlation values are all greater than the pairing threshold 0.3.

(2) First Iterative Processing Procedure (R, C) is the first channel pair added to a first channel pair set, and correlation values of channel pairs including R and/or C are deleted from Table 1a to obtain Table 1b.

TABLE 1b

| Channel signal/ Correlation value | R | C | LS | RS |
|---|---|---|---|---|
| L | ~~0.36~~ | ~~0.47~~ | 0.39 | ~~0.27~~ |
| R | | ~~0.57~~ | ~~0.22~~ | ~~0.08~~ |
| C | | | ~~0.31~~ | ~~0.26~~ |
| LS | | | | 0.42 |

The largest correlation value in Table 1b is 0.42 (LS, RS). Therefore, LS and RS form a second channel pair, and the second channel pair is added to the first channel pair set. In this case, only one channel signal L remains in the five channel signals, and pairing cannot continue. Therefore, the final first channel pair set includes two channel pairs (R, C) and (LS, RS).

A sum of correlation values of the first channel pair set is calculated, that is, S(1)=0.57+0.42=0.99.

(3) Second Iterative Processing Procedure (L, C) is the first channel pair added to a second channel pair set, and correlation values of channel pairs including L and/or C are deleted from Table 1a to obtain Table 1c.

TABLE 1c

| Channel signal/ Correlation value | R | C | LS | RS |
|---|---|---|---|---|
| L | ~~0.36~~ | ~~0.47~~ | ~~0.39~~ | ~~0.27~~ |
| R | | ~~0.57~~ | ~~0.22~~ | ~~0.08~~ |
| C | | | ~~0.31~~ | ~~0.26~~ |
| LS | | | | 0.42 |

The largest correlation value in Table 1c is 0.42 (LS, RS). Therefore, LS and RS form a second channel pair, and the second channel pair is added to the second channel pair set. In this case, only one channel signal R remains in the five channel signals, and pairing cannot continue. Therefore, the final second channel pair set includes two channel pairs (L, C) and (LS, RS).

A sum of correlation values of the second channel pair set is calculated, that is, S(2)=0.47+0.42=0.89.

(4) Third Iterative Processing Procedure (LS, RS) is the first channel pair added to a third channel pair set, and correlation values of channel pairs including LS and/or RS are deleted from Table 1a to obtain Table 1d.

TABLE 1d

| Channel signal/ Correlation value | R | C | LS | RS |
|---|---|---|---|---|
| L | 0.36 | 0.47 | ~~0.39~~ | ~~0.27~~ |
| R | | 0.57 | ~~0.22~~ | ~~0.08~~ |
| C | | | ~~0.31~~ | ~~0.26~~ |
| LS | | | | ~~0.42~~ |

The largest correlation value in Table 1 d is 0.57 (R, C). Therefore, R and C form a second channel pair, and the second channel pair is added to the third channel pair set. In this case, only one channel signal L remains in the five channel signals, and pairing cannot continue. Therefore, the final third channel pair set includes two channel pairs (LS, RS) and (R, C).

A sum of correlation values of the third channel pair set is calculated, that is, S(3)=0.42+0.57=0.99.

(5) Obtaining a Target Channel Pair Set

S(1) and S(3) are the largest in S(1), S(2), and S(3), and channel pairs included in two channel pair sets corresponding to S(1) and S(3) are the same. Therefore, the channel pair set corresponding to S(1) (or S(3)) is used as the target channel pair set, in other words, in this embodiment, channel pairs that can be obtained by the 5.1 channels include (L, C) and (LS, RS). The target channel pair set may be represented by using indexes. Index values may be set for channel pairs corresponding to all the correlation values in Table 1. After the target channel pair set is determined, channel pairs in the target channel pair set may be represented by using corresponding index values, to reduce a quantity of bits in the bitstream.

Embodiment 2

The 7.1 channels are used as examples. The 7.1 channels include a C channel, an L channel, an R channel, an LS channel, an RS channel, a left back (LB) channel, a right back (RB) channel, and an LFE channel. For these channels, the channel pair set generation module may use a multi-channel mask to remove a channel that does not require multi-channel processing, to improve encoding efficiency. The LFE channel may be removed from the 7.1 channels. Therefore, the channel signals input to the channel pair set generation module include a C channel signal, an L channel signal, an R channel signal, an LS channel signal, an RS channel signal, an LB channel signal, and an RB channel signal. The method for obtaining the target channel pair set may include the following operations.

(1) Calculating a Correlation Value Between any Two of the Seven Channel Signals.

In this embodiment, the formula in Embodiment 1 may also be used to calculate the correlation value between the two channel signals.

In this embodiment, there are seven channel signals in pairing in the 7.1 channels. Therefore, the obtained correlation value set may include correlation values of a maximum of $$T = 7 \times \frac{7-1}{2} = 21$$

channel pairs. Table 2 shows an example of a correlation value set of the 7.1 channels.

TABLE 2

| Channel signal/ Correlation value | R | C | LS | RS | LB | RB |
|---|---|---|---|---|---|---|
| L | 0.36 | 0.47 | 0.39 | 0.27 | 0.43 | 0.24 |
| R | | 0.57 | 0.22 | 0.08 | 0.19 | 0.21 |
| C | | | 0.31 | 0.26 | 0.36 | 0.07 |
| LS | | | | 0.42 | 0.67 | 0.03 |
| RS | | | | | 0.64 | 0.07 |
| LB | | | | | | 0.19 |

The pairing threshold is set to 0.3, in other words, only two channel signals whose correlation value is greater than 0.3 can be paired. Therefore, Table 2a may be obtained by deleting correlation values less than the pairing threshold from Table 2. In this way, channel signals with low correlation may not be considered in an iterative processing process, and a calculation amount is reduced.

TABLE 2a

| Channel signal/ Correlation value | R | C | LS | RS | LB | RB |
|---|---|---|---|---|---|---|
| L | 0.36 | 0.47 | 0.39 | ~~0.27~~ | 0.43 | ~~0.24~~ |
| R | | 0.57 | ~~0.22~~ | ~~0.08~~ | ~~0.19~~ | ~~0.21~~ |
| C | | | 0.31 | ~~0.26~~ | 0.36 | ~~0.07~~ |
| LS | | | | 0.42 | 0.67 | ~~0.03~~ |
| RS | | | | | 0.64 | ~~0.07~~ |
| LB | | | | | | ~~0.19~~ |

N is set to the maximum quantity of channel pairs plus one, that is, $$N = \left\lfloor \frac{7}{2} \right\rfloor + 1 = 4.$$

N=4 maximum correlation values are selected from Table 2a, for example, 0.67 (LS, LB), 0.64 (RS, LB), 0.57 (R, C) and 0.47 (L, C) in descending order; and the four correlation values are all greater than the pairing threshold 0.3.

(2) First Iterative Processing Procedure (LS, LB) is the first channel pair added to the first channel pair set, and correlation values of channel pairs including LS and/or LB are deleted from Table 2a to obtain Table 2b.

TABLE 2b

| Channel signal/ Correlation value | R | C | LS | RS | LB | RB |
|---|---|---|---|---|---|---|
| L | 0.36 | 0.47 | ~~0.39~~ | ~~0.27~~ | ~~0.43~~ | ~~0.24~~ |
| R | | 0.57 | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

The largest correlation value in Table 2b is 0.57 (R, C). Therefore, R and C form a second channel pair, and the second channel pair is added to the first channel pair set. Correlation values of channel pairs including R and/or C are deleted from Table 2b to obtain Table 2c.

TABLE 2c

| Channel signal/ Correlation value | R | C | LS | RS | LB | RB |
|---|---|---|---|---|---|---|
| L | ~~0.36~~ | ~~0.47~~ | ~~0.39~~ | ~~0.27~~ | ~~0.43~~ | ~~0.24~~ |
| R | | ~~0.57~~ | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

There is no available correlation value in Table 2c. Therefore, the final first channel pair set includes two channel pairs (LS, LB) and (R, C).

A sum of correlation values of the first channel pair set is calculated, that is, S(1)=0.67+0.57=1.24.

(3) Second Iterative Processing Procedure (RS, LB) is the first channel pair added to the second channel pair set, and correlation values of channel pairs including RS and/or LB are deleted from Table 2a to obtain Table 2d.

TABLE 2d

| Channel signal/ Correlation value | R | C | LS | RS | LB | RB |
|---|---|---|---|---|---|---|
| L | 0.36 | 0.47 | 0.39 | ~~0.27~~ | ~~0.43~~ | ~~0.24~~ |
| R | | 0.57 | ~~0.22~~ | ~~0.08~~ | ~~0.19~~ | ~~0.21~~ |
| C | | | 0.31 | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

The largest correlation value in Table 2d is 0.57 (R, C). Therefore, R and C form a second channel pair, and the second channel pair is added to the second channel pair set. Correlation values of channel pairs including R and/or C are deleted from Table 2d to obtain Table 2e.

TABLE 2e

| Channel signal/ Correlation value | R | C | LS | RS | LB | RB |
|---|---|---|---|---|---|---|
| L | ~~0.36~~ | ~~0.47~~ | 0.39 | ~~0.27~~ | ~~0.43~~ | ~~0.24~~ |
| R | | ~~0.57~~ | ~~0.22~~ | ~~0.08~~ | ~~0.19~~ | ~~0.21~~ |
| C | | | 0.31 | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

The largest correlation value in Table 2e is 0.39 (L, LS). Therefore, L and LS form a third channel pair, and the third channel pair is added to the second channel pair set. Correlation values of channel pairs including L and/or LS are deleted from Table 2e to obtain Table 2f.

TABLE 2f

| Channel signal/ Correlation value | R | C | LS | RS | LB | RB |
|---|---|---|---|---|---|---|
| L | ~~0.36~~ | ~~0.47~~ | ~~0.39~~ | ~~0.27~~ | ~~0.43~~ | ~~0.24~~ |
| R | | ~~0.57~~ | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

There is no available correlation value in Table 2f Therefore, the final second channel pair set includes three channel pairs (RS, LB), (R, C), and (L, LS).

A sum of correlation values of the second channel pair set is calculated, that is, S(2)=0.64+0.57+0.39=1.6.

(4) Third Iterative Processing Procedure (R, C) is the first channel pair added to the third channel pair set, and correlation values of channel pairs including R and/or C are deleted from Table 2a to obtain Table 2g.

TABLE 2g

| Channel signal/ Correlation value | R | C | LS | RS | LB | RB |
|---|---|---|---|---|---|---|
| L | ~~0.36~~ | ~~0.47~~ | 0.39 | ~~0.27~~ | 0.43 | ~~0.24~~ |
| R | | ~~0.57~~ | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | 0.42 | 0.67 | ~~0.03~~ |
| RS | | | | | 0.64 | ~~0.07~~ |
| LB | | | | | | ~~0.19~~ |

The largest correlation value in Table 2g is 0.67 (LS, LB). Therefore, LS and LB form a second channel pair, and the second channel pair is added to the third channel pair set. Correlation values of channel pairs including LS and/or LB are deleted from Table 2g to obtain Table 2h.

TABLE 2h

| Channel signal/ Correlation value | R | C | LS | RS | LB | RB |
|---|---|---|---|---|---|---|
| L | ~~0.36~~ | ~~0.47~~ | ~~0.39~~ | ~~0.27~~ | ~~0.43~~ | ~~0.24~~ |
| R | | ~~0.57~~ | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

There is no available correlation value in Table 2h. Therefore, the final third channel pair set includes two channel pairs (R, C) and (LS, LB).

A sum of correlation values of the third channel pair set is calculated, that is, S(3)=0.57+0.67=1.24.

(5) Fourth Iterative Processing Procedure (L, C) is the first channel pair added to a fourth channel pair set, and correlation values of channel pairs including L and/or C are deleted from Table 2a to obtain Table 2i.

TABLE 2i

| Channel signal/ Correlation value | R | C | LS | RS | LB | RB |
|---|---|---|---|---|---|---|
| L | ~~0.36~~ | ~~0.47~~ | ~~0.39~~ | ~~0.27~~ | ~~0.43~~ | ~~0.24~~ |
| R | | ~~0.57~~ | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | 0.42 | 0.67 | ~~0.03~~ |
| RS | | | | | 0.64 | ~~0.07~~ |
| LB | | | | | | ~~0.19~~ |

The largest correlation value in Table 2i is 0.67 (LS, LB). Therefore, LS and LB form a second channel pair, and the second channel pair is added to the fourth channel pair set. Correlation values of channel pairs including LS and/or LB are deleted from Table 2i to obtain Table 2j.

TABLE 2j

| Channel signal/ Correlation value | R | C | LS | RS | LB | RB |
|---|---|---|---|---|---|---|
| L | ~~0.36~~ | ~~0.47~~ | ~~0.39~~ | ~~0.27~~ | ~~0.43~~ | ~~0.24~~ |
| R | | ~~0.57~~ | ~~0.22~~ | ~~0.08~~ | ~~0.19~~ | ~~0.21~~ |
| C | | | ~~0.31~~ | ~~0.26~~ | ~~0.36~~ | ~~0.07~~ |
| LS | | | | ~~0.42~~ | ~~0.67~~ | ~~0.03~~ |
| RS | | | | | ~~0.64~~ | ~~0.07~~ |
| LB | | | | | | ~~0.19~~ |

There is no available correlation value in Table 2j. Therefore, the final fourth channel pair set includes two channel pairs (L, C) and (LS, LB).

A sum of correlation values of the third channel pair set is calculated, that is, S(4)=0.47+0.67=1.14.

(6) Obtaining the Target Channel Pair Set

S(2) is the largest in S(1), S(2), S(3), and S(4). Therefore, a channel pair set corresponding to S(2) is used as the target channel pair set, in other words, channel pairs that can be obtained by the 7.1 channels in this embodiment include (RS, LB), (R, C), and (L, LS).

Compared with Embodiment 1, Embodiment 2 has one more iterative processing process, and the target channel pair set includes one more channel pair. This is related to a quantity of channel signals in pairing.

Figure 5:
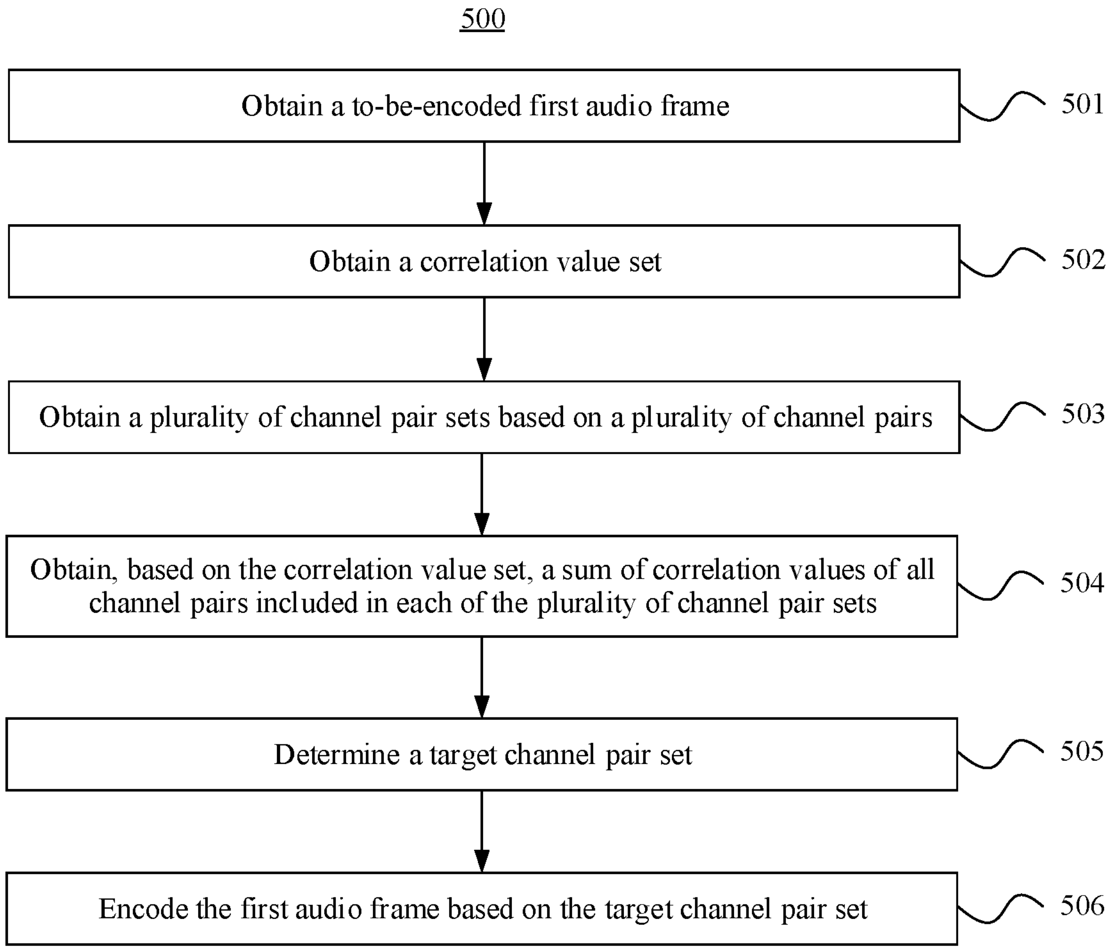
FIG. 5 is a flowchart of an example embodiment of a multi-channel audio signal encoding method according to this application.

FIG. 5 is a flowchart of an example embodiment of a multi-channel audio signal encoding method according to this application. The process 500 may be executed by the source device 12 in the audio coding system 10 or the audio coding device 200. The process 500 includes a series of steps or operations. It should be understood that the process 500 may be performed in various sequences and/or simultaneously, and is not limited to an execution sequence shown in FIG. 5. As shown in FIG. 5, the method includes the following operations.

Operation 501: Obtain a to-be-encoded first audio frame.

Operation 502: Obtain a correlation value set.

For operations 501 and 502 in this embodiment, refer to operations 301 and 302. Details are not described herein again.

Operation 503: Obtain a plurality of channel pair sets based on a plurality of channel pairs.

The correlation value set includes correlation values of a plurality of channel pairs of at least five channel signals in the first audio frame, and the plurality of channel pairs are regularly combined (in other words, a plurality of channel pairs in a same channel pair set cannot include a same channel signal) to obtain the plurality of channel pair sets corresponding to the at least five channel signals.

In an embodiment, when a quantity of channel signals is an odd number, a quantity of all channel pair sets may be calculated according to the following formula:

$$\text{Pair\_num} = \frac{C_{CH}^2 \times C_{CH-2}^2 \times \ldots \times C_3^2}{A_{CH/2}^{CH/2}}$$

In an embodiment, when the quantity of channel signals is an even number, the quantity of all the channel pair sets may be calculated according to the following formula:

$$\text{Pair\_num} = \frac{C_{CH}^2 \times C_{CH-2}^2 \times \ldots \times C_2^2}{A_{CH/2}^{CH/2}}$$

Pair_num indicates the quantity of all the channel pair sets; and CH indicates a quantity of channel signals in multi-channel processing in the first audio frame, and is a result obtained through multi-channel mask filtering.

In an embodiment, to reduce a calculation amount, after the correlation value set is obtained, the plurality of channel pair sets may be obtained based on channel pairs other than an uncorrelated channel pair in the plurality of channel pairs, where a correlation value of the uncorrelated channel pair is less than a pairing threshold. In this way, when the channel pair set is obtained, a quantity of channel pairs in calculation may be reduced, a quantity of channel pair sets is reduced, and a calculation amount of a sum of correlation values may also be reduced in a subsequent operation.

In an embodiment, to reduce the calculation amount, after the correlation value set is obtained, channel signals whose correlation values between the channel signals and other channel signals are all less than the pairing threshold may be deleted. In other words, the channel signals are not considered for pairing. When the channel pair set is obtained, the quantity of channel pairs in calculation may be reduced, the quantity of channel pair sets is reduced, and the calculation amount of the sum of the correlation values may also be reduced in the subsequent operation.

Operation 504: Obtain, based on the correlation value set, a sum of correlation values of all channel pairs included in each of the plurality of channel pair sets.

For each channel pair set, the sum of the correlation values of all the channel pairs included in the channel pair set is calculated.

Operation 505: Determine a target channel pair set.

Operation 506: Encode the first audio frame based on the target channel pair set.

For operations 505 and 506 in this embodiment, refer to operations 305 and 306. Details are not described herein again.

In this embodiment, sums of correlation values of the plurality of channel pair sets are obtained as much as possible, and then a channel pair set whose sum of correlation values is the largest is determined as the target channel pair set. In this way, a sum of correlation values of all channel pairs included in the target channel pair set is the largest, a quantity of channel pairs is increased as much as possible, redundancy between channel signals is reduced, and audio encoding efficiency is improved.

The following describes, by using a specific embodiment, a process of obtaining the target channel pair set in the method embodiment shown in FIG. 5. The process is still implemented by the channel pair set generation module in the encoding apparatus shown in FIG. 4.

Embodiment 3

The 5.1 channels are used as examples. The 5.1 channels include the C channel, the L channel, the R channel, the LS channel, the RS channel, and the LFE channel. For these channels, the channel pair set generation module may use a multi-channel mask to remove a channel that does not require multi-channel processing, to improve encoding efficiency. The LFE channel may be removed from the 5.1 channels. Therefore, channel signals input to the channel pair set generation module include the C channel signal, the L channel signal, the R channel signal, the LS channel signal, and the RS channel signal. The method for obtaining the target channel pair set may include the following operations.

(1) Calculating a Correlation Value Between any Two of the Five Channel Signals.

In this embodiment, the formula in Embodiment 1 may also be used to calculate the correlation value between the two channel signals.

In this embodiment, there are five channel signals in pairing in the 5.1 channels. Therefore, the obtained correlation value set may include correlation values of a maximum of $$T = 5 \times \frac{5-1}{2} = 10$$

channel pairs, which are shown in Table 1.

(2) Calculating a Sum of Correlation Values of all Channel Pair Sets Corresponding to the Five Channel Signals.

As shown in Table 1, 10 correlation values may be obtained for the five channel signals. Correspondingly, 10 channel pairs may be obtained, and then a maximum of $$\text{Pair\_num} = \frac{C_5^2 \times C_3^2}{A_2^2} = 15$$

channel pair sets may be obtained for the 10 channel pairs, for example, {(L, R), (LS, RS)}, {(L, R),(C, RS)}, {(L, R), (LS, C)}, and . . . .

For a channel pair set S(i), a sum of correlation values of all channel pairs included in S(i) is calculated, where $1 \le i \le 15$, for example, S(1)=corr(L, R)+corr(LS, RS), S(2)=corr(L, R)+corr(C, RS), S(3)=corr(L, R)+corr(LS, C), and . . . .

In an embodiment, when the sum of the correlation values is calculated, if a correlation value of a channel pair is less than the pairing threshold, the correlation value of the channel pair may be set to 0.

In an embodiment, to reduce the calculation amount, before the channel pair set is obtained, a channel pair whose correlation value is less than the pairing threshold may be excluded. In this way, when the channel pair set is obtained, a quantity of channel pairs may be reduced, and the quantity of channel pair sets is reduced.

Figure 6:
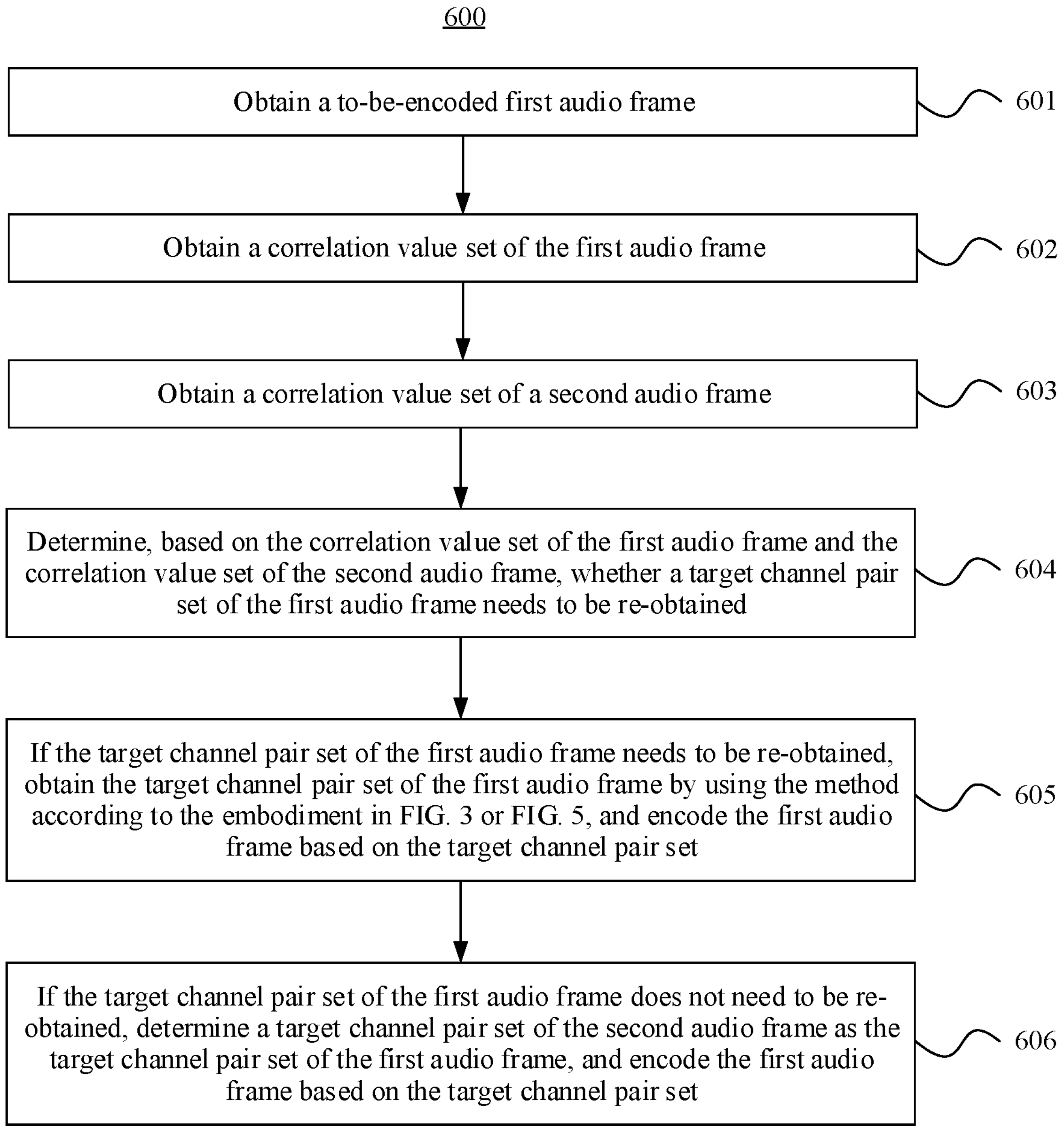
FIG. 6 is a flowchart of an example embodiment of a multi-channel audio signal encoding method according to this application.

FIG. 6 is a flowchart of an example embodiment of a multi-channel audio signal encoding method according to this application. The process 600 may be executed by the source device 12 in the audio coding system 10 or the audio coding device 200. The process 600 includes a series of steps or operations. It should be understood that the process 600 may be performed in various sequences and/or simultaneously, and is not limited to an execution sequence shown in FIG. 6. As shown in FIG. 6, the method includes the following operations.

Operation 601: Obtain a to-be-encoded first audio frame.

For operation 601, refer to operation 301. Details are not described herein again.

Operation 602: Obtain a correlation value set of the first audio frame.

The correlation value set of the first audio frame includes respective correlation values of a plurality of channel pairs, one channel pair includes two channel signals of at least five channel signals, and a correlation value of the channel pair indicates correlation between the two channel signals of the channel pair.

Operation 603: Obtain a correlation value set of a second audio frame.

The correlation value set of the second audio frame includes respective correlation values of a plurality of channel pairs of the second audio frame, one channel pair includes two channel signals of at least five channel signals of the second audio frame, a correlation value of the channel pair indicates correlation between the two channel signals of the channel pair, and the second audio frame is a previous frame of the first audio frame.

A difference between this embodiment and operation 302 is that, in this embodiment, in addition to obtaining the correlation value set of the first audio frame, the correlation value set of the previous frame of the first audio frame (namely, the second audio frame) further needs to be obtained.

For a method for obtaining the correlation value set of the first audio frame, refer to operation 302. Details are not described herein again.

Because encoding of the second audio frame is performed before encoding of the first audio frame, when the first audio frame is processed, the encoding apparatus has obtained related information for encoding the second audio frame, where the related information includes the correlation value set of the second audio frame. Therefore, in this embodiment, the correlation value set of the second audio frame may be directly read from a cache or a memory, and the correlation value set of the second audio frame does not need to be obtained through calculation again.

Operation 604: Determine, based on the correlation value set of the first audio frame and the correlation value set of the second audio frame, whether a target channel pair set of the first audio frame needs to be re-obtained.

In this embodiment, a sum of differences between the correlation value set of the first audio frame and the correlation value set of the second audio frame may be calculated as a determining basis. In other words, an absolute value of a difference between correlation values corresponding to a same channel pair in the correlation value set of the first audio frame and the correlation value set of the second audio frame is calculated, and a sum of absolute values corresponding to the plurality of channel pairs is calculated. When the sum of the absolute values is less than a change threshold, it is determined that the target channel pair set of the first audio frame does not need to be re-obtained; or when the sum of the absolute values is greater than or equal to the change threshold, it is determined that the target channel pair set of the first audio frame needs to be re-obtained.

The difference between the correlation values corresponding to the same channel pair is calculated, and then the sum of the absolute values of differences between all the channel pairs is calculated. In this way, whether a change of correlation values between channel signals of the first audio frame relative to the second audio frame exceeds the change threshold may be obtained. If the change does not exceed the change threshold, it indicates that a change from the second audio frame to the first audio frame is small, and the target channel pair set may not need to be re-established for the first audio frame, thereby reducing a calculation amount and improving encoding efficiency. If the change exceeds the change threshold, it indicates that the change from the second audio frame to the first audio frame is large, and the target channel pair set of the first audio frame needs to be re-obtained.

Operation 605: If the target channel pair set of the first audio frame needs to be re-obtained, obtain the target channel pair set of the first audio frame by using the method in the embodiment shown in FIG. 3 or FIG. 5, and encode the first audio frame based on the target channel pair set.

In this embodiment, when it is determined that the target channel pair set of the first audio frame needs to be re-obtained, the method in the embodiment shown in FIG. 3 or FIG. 5 may be used to obtain the correlation value set of the first audio frame. Details are not described herein again.

Operation 606: If the target channel pair set of the first audio frame does not need to be re-obtained, determine a target channel pair set of the second audio frame as the target channel pair set of the first audio frame, and encode the first audio frame based on the target channel pair set.

In this embodiment, when it is determined that the target channel pair set of the first audio frame does not need to be re-obtained, the target channel pair set of the second audio frame may be directly used as the target channel pair set of the first audio frame. In this way, a calculation amount is reduced and encoding efficiency is improved.

In this embodiment, a sum of differences between a correlation value set of a current audio frame and a correlation value set of a previous audio frame is obtained, to determine whether a target channel pair set of the current frame needs to be re-obtained, which can greatly reduce a calculation amount and improve encoding efficiency when an audio change is small. Even if the audio change is large and the target channel pair set needs to be re-obtained, sums of correlation values of the plurality of channel pair sets may still be obtained as much as possible, to determine a channel pair set whose sum of correlation values is the largest as the target channel pair set. In this way, a sum of correlation values of all channel pairs included in the target channel pair set is the largest, a quantity of channel pairs is increased as much as possible, redundancy between channel signals is reduced, and audio encoding efficiency is improved.

The following describes, by using a specific embodiment, a process of obtaining the target channel pair set in the method embodiment shown in FIG. 6. The process is still implemented by the channel pair set generation module in the encoding apparatus shown in FIG. 4.

Embodiment 4

The 5.1 channels are used as examples. The 5.1 channels include the C channel, the L channel, the R channel, the LS channel, the RS channel, and the LFE channel. For these channels, the channel pair set generation module may use a multi-channel mask to remove a channel that does not require multi-channel processing, to improve encoding efficiency. The LFE channel may be removed from the 5.1 channels. Therefore, channel signals input to the channel pair set generation module include the C channel signal, the L channel signal, the R channel signal, the LS channel signal, and the RS channel signal. The method for obtaining the target channel pair set may include the following operations.

(1) Calculating a Correlation Value Between any Two of the Five Channel Signals.

In this embodiment, the formula in Embodiment 1 may also be used to calculate the correlation value between the two channel signals.

In this embodiment, there are five channel signals in pairing in the 5.1 channels. Therefore, the obtained correlation value set may include correlation values or a maximum or $$T = 5 \times \frac{5-1}{2} = 10$$

channel pairs, which are shown in Table 1.

(2) Calculating the Sum of the Differences Between the Correlation Value Set of the First Audio Frame and the Correlation Value Set of the Second Audio Frame.

In this embodiment, both the correlation value set of the first audio frame and the correlation value set of the second audio frame are represented in a form of matrix, to obtain matrices Matrix1 and Matrix2 respectively. A value of each element in the matrix corresponds to a correlation value in the correlation value set. The sum of the differences may be calculated according to the following formula:

$$D = \sum_{i=1}^{T} |Matrix1(i) - Matrix2(i)|$$

D indicates the sum of the differences between the correlation value set of the first audio frame and the correlation value set of the second audio frame, Matrix1(i) indicates an $i^{th}$ element value in the matrix corresponding to the correlation value set of the first audio frame, and Matrix2(i) indicates an $i^{th}$ element value in the matrix corresponding to the correlation value set of the second audio frame.

(3) Determining, Based on the Sum D of the Correlation Values, Whether the Target Channel Pair Set of the First Audio Frame Needs to be Re-Obtained.

In this embodiment, one change threshold is set; and whether the target channel pair set of the first audio frame needs to be re-obtained is determined based on the threshold. In an embodiment, in this embodiment, a flag keepFlag may be further set. When keepFlag=1, it indicates that the first audio frame may reserve a target channel pair set of a previous frame, in other words, the target channel pair set of the first audio frame does not need to be re-obtained. When keepFlag=0, it indicates that the first audio frame cannot reserve the target channel pair set of the previous frame, in other words, the target channel pair set of the first audio frame needs to be re-obtained.

Based on the foregoing setting, when D<change threshold, keepFlag=1; and when D≥change threshold, keepFlag=0.

(4) Obtaining the Target Channel Pair Set of the First Audio Frame.

Based on a value of the flag keepFlag, the encoding apparatus may obtain the target channel pair set of the first audio frame. To be specific, when keepFlag=1, the encoding apparatus directly uses the target channel pair set of the second audio frame as the target channel pair set of the first audio frame. When keepFlag=0, the encoding apparatus may obtain the target channel pair set of the first audio frame by using the method in the embodiment shown in FIG. 3 or FIG. 5. Details are not described herein again.

Figure 7:
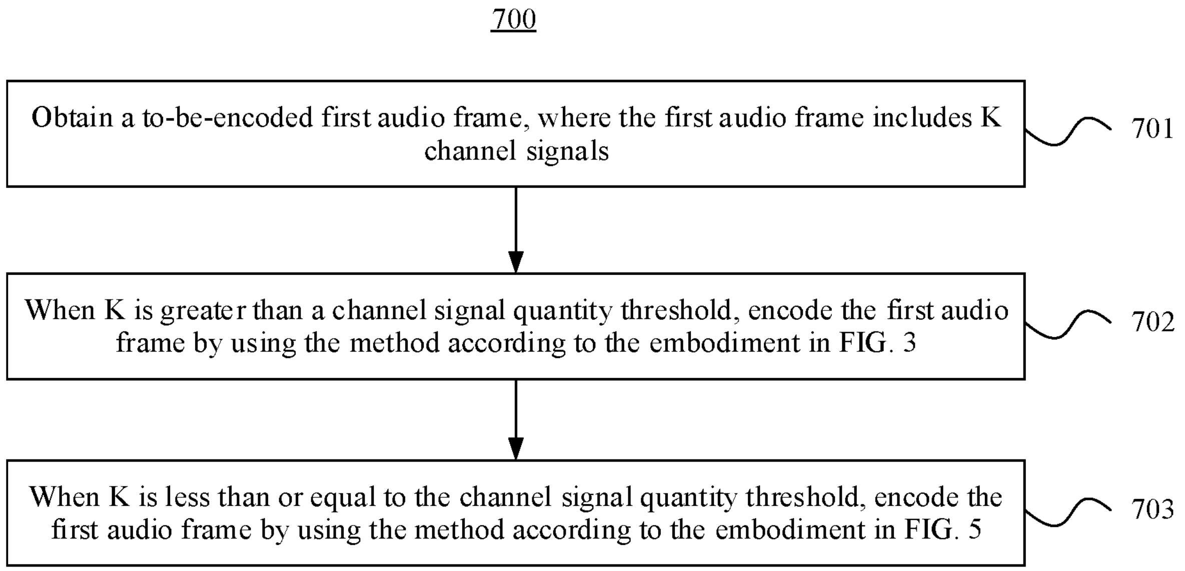
FIG. 7 is a flowchart of an example embodiment of a multi-channel audio signal encoding method according to this application.

FIG. 7 is a flowchart of an example embodiment of a multi-channel audio signal encoding method according to this application. The process 700 may be executed by the source device 12 in the audio coding system 10 or the audio coding device 200. The process 700 includes a series of steps or operations. It should be understood that the process 700 may be performed in various sequences and/or simultaneously, and is not limited to an execution sequence shown in FIG. 7. As shown in FIG. 7, the method includes the following operations.

Operation 701: Obtain a to-be-encoded first audio frame, where the first audio frame includes K channel signals.

For operation 701, refer to operation 301. Details are not described herein again.

Operation 702: When K is greater than a channel signal quantity threshold, encode the first audio frame by using the method according to the embodiment in FIG. 3.

Operation 703: When K is less than or equal to the channel signal quantity threshold, encode the first audio frame by using the method according to the embodiment in FIG. 5.

A difference between this embodiment and the embodiment in FIG. 3 or FIG. 5 is that, in this embodiment, the methods in FIG. 3 and FIG. 5 are used together, in other words, a method for obtaining a target channel pair set of the first audio frame is determined based on a quantity of channel signals included in the first audio frame. When the first audio frame includes a large quantity of channel signals, if the method in the second aspect is used, all target channel pair sets need to be exhaustively listed, which increases a calculation amount. Therefore, in this case, when the method in the first aspect is used, a lot of calculation amounts are reduced. When the first audio frame includes a small quantity of channel signals, a sum of correlation values of all channel pair sets may be obtained by using the method according to the second aspect, to ensure that a finally selected target channel pair set is definitely an optimal result that best meets a feature of the first audio frame.

Figure 8:
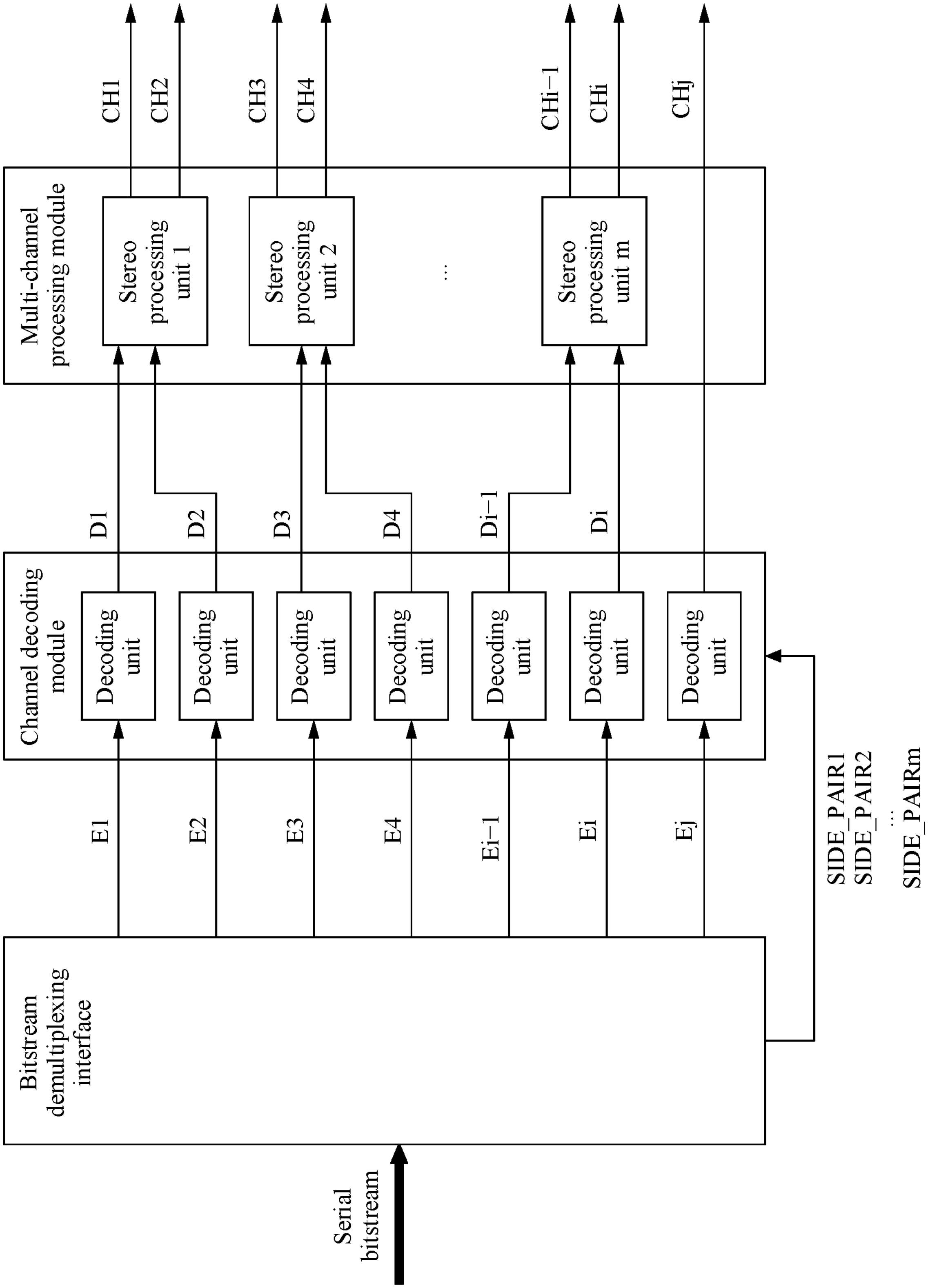
FIG. 8 is an example diagram of a structure of a decoding apparatus to which a multi-channel audio signal decoding method is applied according to this application.

FIG. 8 is an example diagram of a structure of a decoding apparatus to which a multi-channel audio signal decoding method is applied according to this application. The decoding apparatus may be the decoder 30 of the destination device 14 in the audio coding system 10, or may be the coding module 270 in the audio coding device 200. The decoding apparatus may include a bitstream demultiplexing interface, a channel decoding module, and a multi-channel processing module.

The bitstream demultiplexing interface receives an encoded multi-channel signal (for example, a serial bitstream bitstream) from an encoding apparatus, and obtains encoded channel signals (E) and multi-channel parameters (SIDE_PAIR) after demultiplexing, for example, E1, E2, E3, E4, . . . , Ei−1, and Ei; and SIDE_PAIR1, SIDE_PAIR2, . . . , and SIDE_PAIRm.

The channel decoding module uses mono-channel decoding units (or mono-channel channel boxes or mono-channel tools) to decode the encoded channel signals output by the bitstream demultiplexing interface, and output decoded channel signals (D). For example, E1, E2, E3, E4, . . . , Ei−1, and Ei are decoded by the mono-channel decoding units to obtain D1, D2, D3, D4, . . . , Di−1, and Di.

The multi-channel processing module includes a plurality of stereo processing units. The stereo processing unit may use prediction-based or KLT-based processing, in other words, input two channel signals are reversely rotated (for example, by using a 2×2 rotation matrix), to convert the signals to an original signal direction.

That which two decoded channel signals in the decoded channel signals output by the channel decoding module are paired can be identified based on the multi-channel parameters, and the paired decoded channel signals are input into the stereo processing unit. After processing the input two decoded channel signals, the stereo processing unit outputs channel signals (CH) corresponding to the two decoded channel signals. For example, a stereo processing unit 1 processes D1 and D2 based on SIDE_PAIR1 to obtain CH1 and CH2, a stereo processing unit 2 processes D3 and D4 based on SIDE_PAIR2 to obtain CH3 and CH4, . . . , and a stereo processing unit m processes Di−1 and Di based on SIDE_PAIRm to obtain CHi−1 and CHi.

It should be noted that a channel signal (for example, CHj) that is not paired does not need to be processed by a stereo processing unit in the multi-channel processing module, and may be directly output after being decoded.

Figure 9:
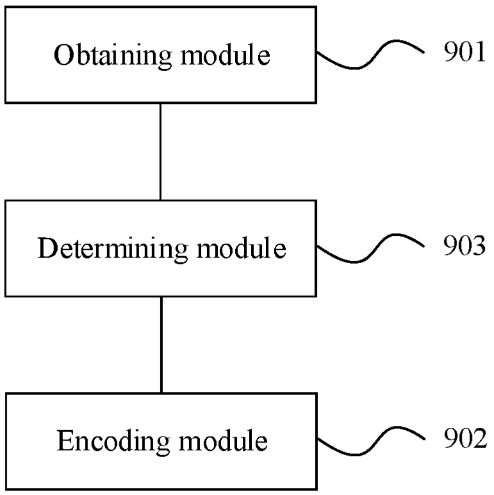
FIG. 9 is a schematic diagram of a structure of an encoding apparatus according to an embodiment of this application.

FIG. 9 is a schematic diagram of a structure of an encoding apparatus according to an embodiment of this application. As shown in FIG. 9, the apparatus may be used in the source device 12 or the audio coding device 200 in the foregoing embodiments. The encoding apparatus in this embodiment may include: an obtaining module 901, an encoding module 902, and a determining module 903.

In an embodiment, the obtaining module 901 is configured to: obtain a to-be-encoded first audio frame, where the first audio frame includes at least five channel signals; obtain a correlation value set, where the correlation value set includes respective correlation values of a plurality of channel pairs, one channel pair includes two channel signals of the at least five channel signals, and a correlation value of the channel pair indicates correlation between the two channel signals of the channel pair; select M correlation values from the correlation value set, where all the M correlation values are greater than correlation values other than the M correlation values in the correlation value set, all the M correlation values are greater than or equal to a pairing threshold, and M is a positive integer less than or equal to a specified value; and obtain M channel pair sets, where each channel pair set includes at least one of M channel pairs corresponding to the M correlation values, and when the channel pair set includes at least two channel pairs, the at least two channel pairs do not include a same channel signal. The determining module 903 is configured to determine a target channel pair set from the M channel pair sets, where a sum of correlation values of all channel pairs in the target channel pair set is the largest in those of the M channel pair sets. The encoding module 902 is configured to encode the first audio frame based on the target channel pair set.

In an embodiment, the M channel pair sets include a first channel pair set. The obtaining module 901 is configured to: add a first channel pair in the M channel pairs to the first channel pair set, where the first channel pair is any one of the M channel pairs; and when channel pairs other than the associated channel pair in the plurality of channel pairs include a channel pair whose correlation value is greater than the pairing threshold, select a channel pair whose correlation value is the largest from the other channel pairs, and add the channel pair to the first channel pair set, where the associated channel pair includes any one of channel signals included in the channel pair that has been added to the first channel pair set.

In an embodiment, the obtaining module 901 is configured to: select N correlation values from the correlation value set, where all the N correlation values are greater than correlation values other than the N correlation values in the correlation value set, and N is the specified value; and select correlation values greater than or equal to the pairing threshold from the N correlation values, where a quantity of correlation values greater than or equal to the pairing threshold is M.

In an embodiment, the correlation value is a normalized value.

In an embodiment, when the correlation value of the channel pair is less than the pairing threshold, the correlation value of the channel pair is set to 0.

In an embodiment, the obtaining module 901 is configured to: obtain a to-be-encoded first audio frame, where the first audio frame includes at least five channel signals; obtain a correlation value set, where the correlation value set includes respective correlation values of a plurality of channel pairs, one channel pair includes two channel signals of the at least five channel signals, and a correlation value of the channel pair indicates correlation between the two channel signals of the channel pair; obtain a plurality of channel pair sets based on the plurality of channel pairs, where when the channel pair set includes at least two channel pairs, the at least two channel pairs do not include a same channel signal; and obtain, based on the correlation value set, a sum of correlation values of all channel pairs included in each of the plurality of channel pair sets. The determining module 903 is configured to determine a target channel pair set, where a sum of correlation values of all channel pairs in the target channel pair set is the largest in those of the plurality of channel pair sets. The encoding module 902 is configured to encode the first audio frame based on the target channel pair set.

In an embodiment, the obtaining module 901 is configured to obtain the plurality of channel pair sets based on channel pairs other than an uncorrelated channel pair in the plurality of channel pairs, where a correlation value of the uncorrelated channel pair is less than a pairing threshold.

In an embodiment, the obtaining module 901 is configured to: obtain a to-be-encoded first audio frame, where the first audio frame includes at least five channel signals; obtain a correlation value set of the first audio frame, where the correlation value set of the first audio frame includes respective correlation values of a plurality of channel pairs, one channel pair includes two channel signals of the at least five channel signals, and a correlation value of the channel pair indicates correlation between the two channel signals of the channel pair; and obtain a correlation value set of a second audio frame, where the correlation value set of the second audio frame includes correlation values of a plurality of channel pairs of the second audio frame, one channel pair includes two channel signals of at least five channel signals of the second audio frame, a correlation value of the channel pair indicates correlation between the two channel signals of the channel pair, and the second audio frame is a previous frame of the first audio frame. The encoding module 902 is configured to: determine, based on the correlation value set of the first audio frame and the correlation value set of the second audio frame, whether a target channel pair set of the first audio frame needs to be re-obtained; if the target channel pair set of the first audio frame needs to be re-obtained, obtain the target channel pair set of the first audio frame by using the method according to the embodiment in FIG. 3 and FIG. 5, and encode the first audio frame based on the target channel pair set; and if the target channel pair set of the first audio frame does not need to be re-obtained, determine a target channel pair set of the second audio frame as the target channel pair set of the first audio frame, and encode the first audio frame based on the target channel pair set.

In an embodiment, the encoding module 902 is configured to: calculate an absolute value of a difference between correlation values corresponding to a same channel pair in the correlation value set of the first audio frame and the correlation value set of the second audio frame; calculate a sum of the absolute values corresponding to the plurality of channel pairs; and when the sum of the absolute values is less than a change threshold, determine that the target channel pair set of the first audio frame does not need to be re-obtained; or when the sum of the absolute values is greater than or equal to the change threshold, determine that the target channel pair set of the first audio frame needs to be re-obtained.

In an embodiment, the obtaining module is configured to obtain a to-be-encoded first audio frame, where the first audio frame includes K channel signals, and K is an integer greater than or equal to 5. The encoding module is configured to: when K is greater than a channel signal quantity threshold, encode the first audio frame by using the method according to the embodiment in FIG. 3; and when K is less than or equal to the channel signal quantity threshold, encode the first audio frame by using the method according to the embodiment in FIG. 5.

The apparatus in this embodiment may be configured to execute the technical solutions in the method embodiment shown in FIG. 3, FIG. 5, FIG. 6, or FIG. 7. Implementation principles and technical effect thereof are similar, and details are not described herein again.

Figure 10:
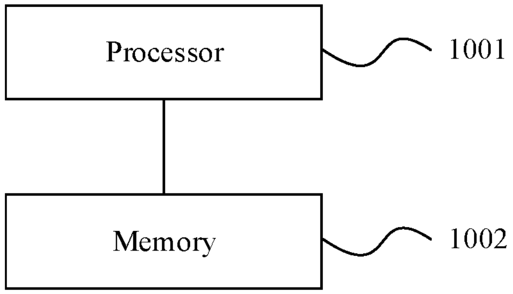
FIG. 10 is a schematic diagram of a structure of a device according to an embodiment of this application.

FIG. 10 is a schematic diagram of a structure of a device according to an embodiment of this application. As shown in FIG. 10, the device may be the encoding device in the foregoing embodiments. The device in this embodiment may include: a processor 1001 and a memory 1002. The memory 1002 is configured to store one or more programs. When the one or more programs are executed by the processor 1001, the processor 1001 is enabled to implement the technical solutions of the method embodiment shown in FIG. 3, FIG. 5, FIG. 6, or FIG. 7.

In an implementation process, operations in the foregoing method embodiments may be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The operations of the methods disclosed in this application may be directly performed by a hardware encoding processor, or may be performed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through an example rather than a limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

Persons of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the foregoing described apparatus embodiments are merely examples. For example, division into the units is merely a logical function division and may be another division during an actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all the units may be selected according to actual needs to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such understanding, the technical solutions in this application essentially, or the part contributing to the conventional technology, or the part of the technical solutions may be implemented in a form of a software product. The computer software product is stored in a storage medium and includes several instructions for instructing a computer device (a personal computer, a server, a network device, or the like) to perform all or a part of the operations of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing description merely describes specific implementations/embodiments of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A multi-channel audio signal encoding method, comprising:

obtaining a to-be-encoded first audio frame, wherein the first audio frame comprises at least five channel signals;

obtaining a correlation value set, wherein the correlation value set comprises respective correlation values of a plurality of channel pairs, wherein one channel pair of the plurality of channel pairs comprises two channel signals of the at least five channel signals, and wherein a correlation value of the channel pair indicates correlation between the two channel signals of the channel pair;

selecting M correlation values from the correlation value set, wherein all the M correlation values are greater than correlation values other than the M correlation values in the correlation value set, wherein all the M correlation values are greater than or equal to a pairing threshold, and wherein M is a positive integer less than or equal to a specified value;

obtaining M channel pair sets, wherein each channel pair set comprises one or more channel pairs corresponding to the M correlation values, and wherein when the channel pair set comprises at least two channel pairs, the at least two channel pairs do not comprise a same channel signal;

determining a target channel pair set from the M channel pair sets, wherein a sum of correlation values of all channel pairs in the target channel pair set is the largest in those of the M channel pair sets; and encoding the first audio frame based on the target channel pair set.

2. The method according to claim 1, wherein the M channel pair sets comprise a first channel pair set, and the obtaining M channel pair sets comprises obtaining the first channel pair set; and the obtaining the first channel pair set comprises:

adding a first channel pair in M channel pairs to the first channel pair set, wherein the first channel pair is any one of the M channel pairs; and when channel pairs other than the associated channel pair in the plurality of channel pairs comprise a channel pair whose correlation value is greater than the pairing threshold, selecting a channel pair whose correlation value is the largest from the other channel pairs, and adding the channel pair to the first channel pair set, wherein the associated channel pair comprises any one of channel signals comprised in the channel pair that has been added to the first channel pair set.

3. The method according to claim 1, wherein the selecting M correlation values from the correlation value set comprises:

selecting N correlation values from the correlation value set, wherein all the N correlation values are greater than correlation values other than the N correlation values in the correlation value set, and N is the specified value; and selecting correlation values greater than or equal to the pairing threshold from the N correlation values, wherein a quantity of correlation values greater than or equal to the pairing threshold is M.

4. The method according to claim 1, wherein the correlation value is a normalized value.

5. The method according to claim 1, wherein when the correlation value of the channel pair is less than the pairing threshold, the correlation value of the channel pair is set to 0.

6. A multi-channel audio signal encoding method, comprising:

obtaining a to-be-encoded first audio frame, wherein the first audio frame comprises at least five channel signals;

obtaining a correlation value set, wherein the correlation value set comprises respective correlation values of a plurality of channel pairs, wherein one channel pair of the plurality of channel pairs comprises two channel signals of the at least five channel signals, and wherein a correlation value of the channel pair indicates correlation between the two channel signals of the channel pair;

obtaining a plurality of channel pair sets based on the plurality of channel pairs, wherein when the channel pair set comprises at least two channel pairs, the at least two channel pairs do not comprise a same channel signal;

obtaining, based on the correlation value set, a sum of correlation values of all channel pairs comprised in each of the plurality of channel pair sets;

determining a target channel pair set, wherein a sum of correlation values of all channel pairs in the target channel pair set is the largest in those of the plurality of channel pair sets; and encoding the first audio frame based on the target channel pair set.

7. The method according to claim 6, the obtaining the plurality of channel pair sets based on the plurality of channel pairs comprises:

obtaining the plurality of channel pair sets based on channel pairs other than an uncorrelated channel pair in the plurality of channel pairs, wherein a correlation value of the uncorrelated channel pair is less than a pairing threshold.

8. The method according to claim 6, wherein the correlation value is a normalized value.

9. The method according to claim 6, wherein when the correlation value of the channel pair is less than a pairing threshold, the correlation value of the channel pair is set to 0.

10. A device, comprising:

one or more processors; and a memory, configured to store one or more programs, which, when executed by the one or more processors, cause the device to perform operations comprising:

obtaining a to-be-encoded first audio frame, wherein the first audio frame comprises at least five channel signals;

obtaining a correlation value set, wherein the correlation value set comprises respective correlation values of a plurality of channel pairs, wherein one channel pair of the plurality of channel pairs comprises two channel signals of the at least five channel signals, and wherein a correlation value of the channel pair indicates correlation between the two channel signals of the channel pair;

selecting M correlation values from the correlation value set, wherein all the M correlation values are greater than correlation values other than the M correlation values in the correlation value set, wherein all the M correlation values are greater than or equal to a pairing threshold, and wherein M is a positive integer less than or equal to a specified value;

obtaining M channel pair sets, wherein each channel pair set comprises one or more channel pairs corresponding to the M correlation values, and wherein when the channel pair set comprises at least two channel pairs, the at least two channel pairs do not comprise a same channel signal;

determining a target channel pair set from the M channel pair sets, wherein a sum of correlation values of all channel pairs in the target channel pair set is the largest in those of the M channel pair sets; and encoding the first audio frame based on the target channel pair set.

11. The device according to claim 10, wherein the M channel pair sets comprise a first channel pair set, and the obtaining M channel pair sets comprises obtaining the first channel pair set; and the obtaining the first channel pair set comprises:

adding a first channel pair in M channel pairs to the first channel pair set, wherein the first channel pair is any one of the M channel pairs; and when channel pairs other than the associated channel pair in the plurality of channel pairs comprise a channel pair whose correlation value is greater than the pairing threshold, selecting a channel pair whose correlation value is the largest from the other channel pairs, and adding the channel pair to the first channel pair set, wherein the associated channel pair comprises any one of channel signals comprised in the channel pair that has been added to the first channel pair set.

12. The device according to claim 10, wherein the selecting M correlation values from the correlation value set comprises:

selecting N correlation values from the correlation value set, wherein all the N correlation values are greater than correlation values other than the N correlation values in the correlation value set, and N is the specified value; and selecting correlation values greater than or equal to the pairing threshold from the N correlation values, wherein a quantity of correlation values greater than or equal to the pairing threshold is M.

13. The device according to claim 10, wherein the correlation value is a normalized value.

14. The device according to claim 13, wherein the correlation value is used as an initial correlation value, wherein the initial correlation value is to be modified based on a preset condition.

15. The device according to claim 10, wherein when the correlation value of the channel pair is less than the pairing threshold, the correlation value of the channel pair is set to 0.

16. A device, comprising:

one or more processors; and a memory, configured to store one or more programs, which, when executed by the one or more processors cause the device to perform operations comprising:

obtaining a to-be-encoded first audio frame, wherein the first audio frame comprises at least five channel signals;

obtaining a correlation value set, wherein the correlation value set comprises respective correlation values of a plurality of channel pairs, wherein one channel pair of the plurality of channel pairs comprises two channel signals of the at least five channel signals, and wherein a correlation value of the channel pair indicates correlation between the two channel signals of the channel pair;

obtaining a plurality of channel pair sets based on the plurality of channel pairs, wherein when the channel pair set comprises at least two channel pairs, the at least two channel pairs do not comprise a same channel signal;

obtaining, based on the correlation value set, a sum of correlation values of all channel pairs comprised in each of the plurality of channel pair sets;

determining a target channel pair set, wherein a sum of correlation values of all channel pairs in the target channel pair set is the largest in those of the plurality of channel pair sets; and encoding the first audio frame based on the target channel pair set.

17. The device according to claim 16, the obtaining a plurality of channel pair sets based on the plurality of channel pairs comprises:

obtaining the plurality of channel pair sets based on channel pairs other than an uncorrelated channel pair in the plurality of channel pairs, wherein a correlation value of the uncorrelated channel pair is less than a pairing threshold.

18. The device according to claim 16, wherein the correlation value is a normalized value.

19. The device according to claim 18, wherein the correlation value is used as an initial correlation value, wherein the initial correlation value is to be modified based on a preset condition.

20. The device according to claim 16, wherein when the correlation value of the channel pair is less than a pairing threshold, the correlation value of the channel pair is set to 0.

* * * * *